(12) United States Patent
Wakana et al.

(10) Patent No.: US 8,730,489 B2
(45) Date of Patent: May 20, 2014

(54) PRINTING SYSTEM, PRINTING SYSTEM CONTROL METHOD, AND RECORDING MEDIUM FOR SHEET PROCESSING

(75) Inventors: Toru Wakana, Yokohama (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 13/324,473

(22) Filed: Dec. 13, 2011

(65) Prior Publication Data
US 2012/0154862 A1 Jun. 21, 2012

(30) Foreign Application Priority Data
Dec. 15, 2010 (JP) .................. 2010-279856

(51) Int. Cl.
*G06F 15/00* (2006.01)
*G06F 3/12* (2006.01)
*G06K 1/00* (2006.01)
*H04N 1/23* (2006.01)
*G06K 15/16* (2006.01)

(52) U.S. Cl.
CPC ............. *H04N 1/2353* (2013.01); *G06K 15/16* (2013.01); *G06F 3/1264* (2013.01)
USPC .......................................... 358/1.13; 358/1.1

(58) Field of Classification Search
CPC . H04N 1/2307; G06K 15/16; G06K 15/4025; G06F 3/1264; G06F 3/1296
USPC ........................................ 358/1.1, 1.13, 1.15
See application file for complete search history.

(56) References Cited

U.S. PATENT DOCUMENTS

| | | | |
|---|---|---|---|
| 2004/0190057 A1 | 9/2004 | Takahashi et al. | |
| 2010/0225047 A1* | 9/2010 | Yoshimura et al. | 271/9.07 |
| 2013/0256974 A1* | 10/2013 | Unno | 271/9.02 |

* cited by examiner

*Primary Examiner* — Douglas Tran
(74) *Attorney, Agent, or Firm* — Carter, DeLuca, Farrell & Schmidt, LLP

(57) ABSTRACT

A printing system according to the present invention, being capable of controlling a post-processing apparatus to execute post-processing for a sheet printed by a printing apparatus, has an acceptance unit and a control unit. The acceptance unit is configured to accept a post-processing execution request for executing post-processing by the post-processing apparatus without executing print processing by the printing apparatus. The control unit controls, in a case where the acceptance unit accepts the post-processing execution request, the post-processing apparatus to execute the post-processing for a sheet set in a supply source without executing print processing by the printing apparatus.

10 Claims, 32 Drawing Sheets

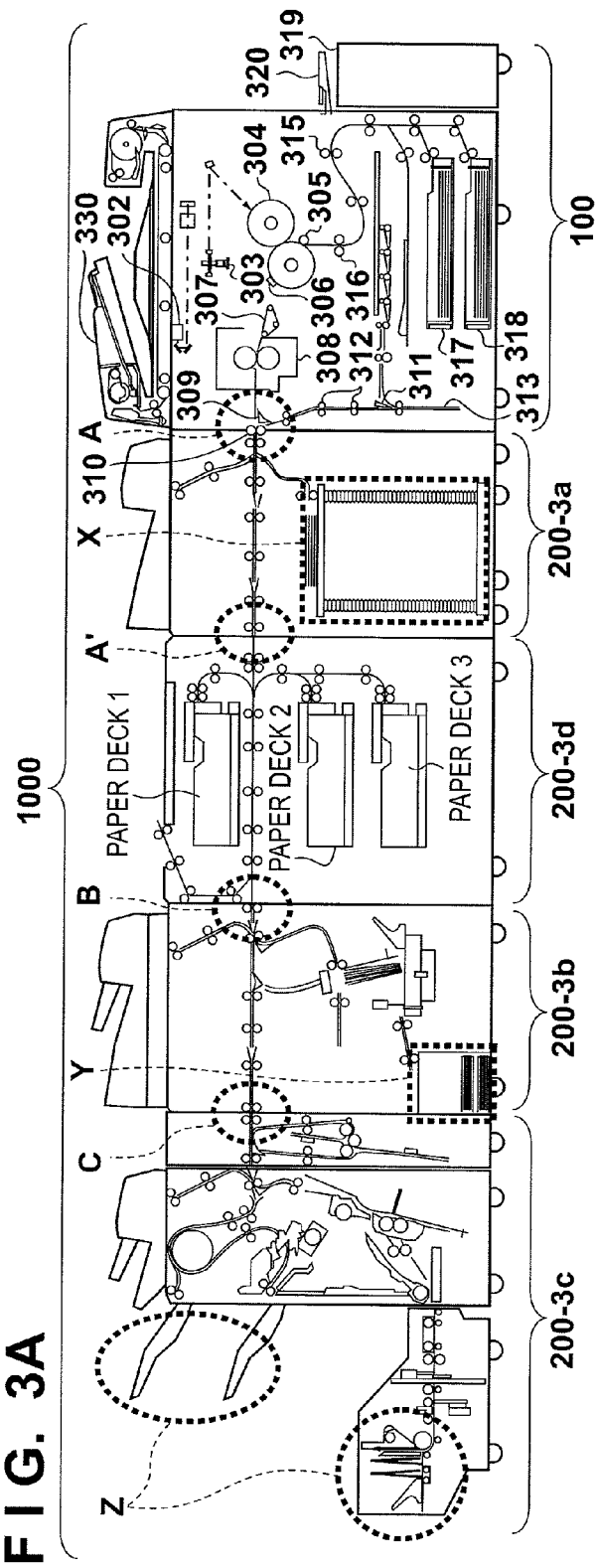
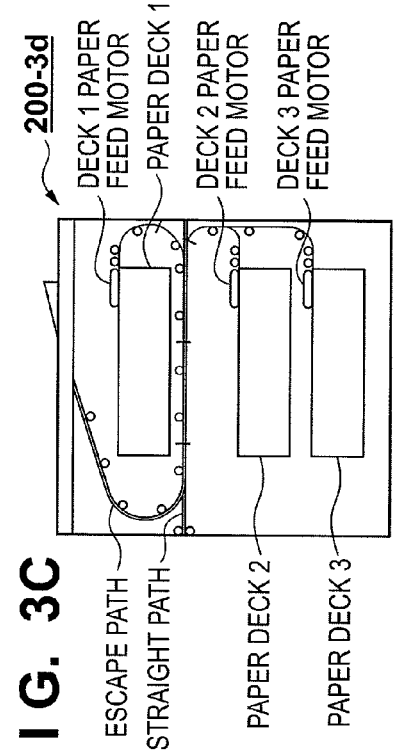
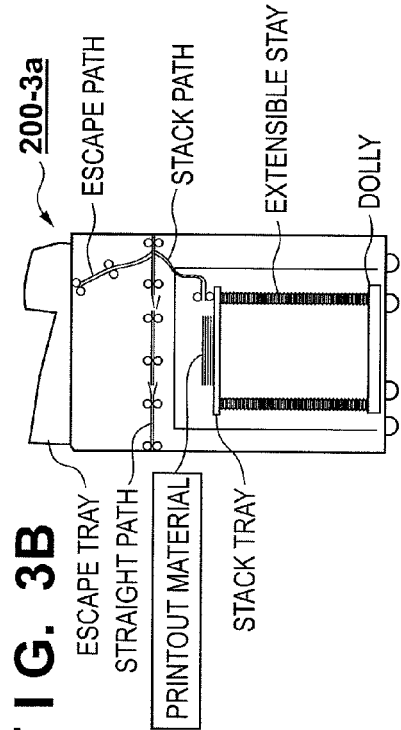
FIG. 3A
FIG. 3C
FIG. 3B

F I G. 13A
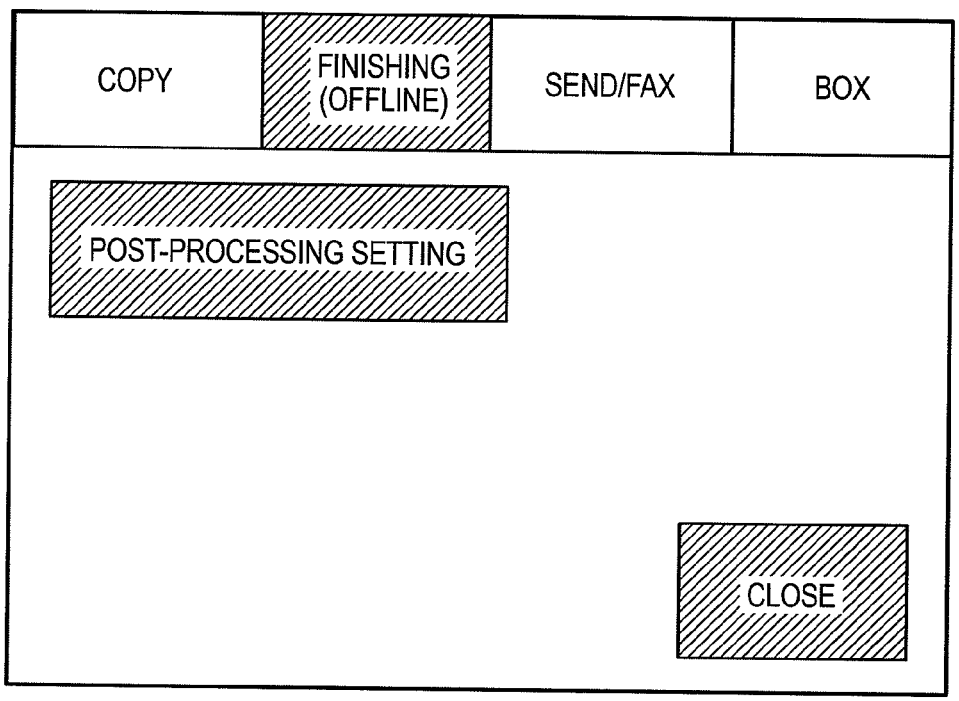
F I G. 13B
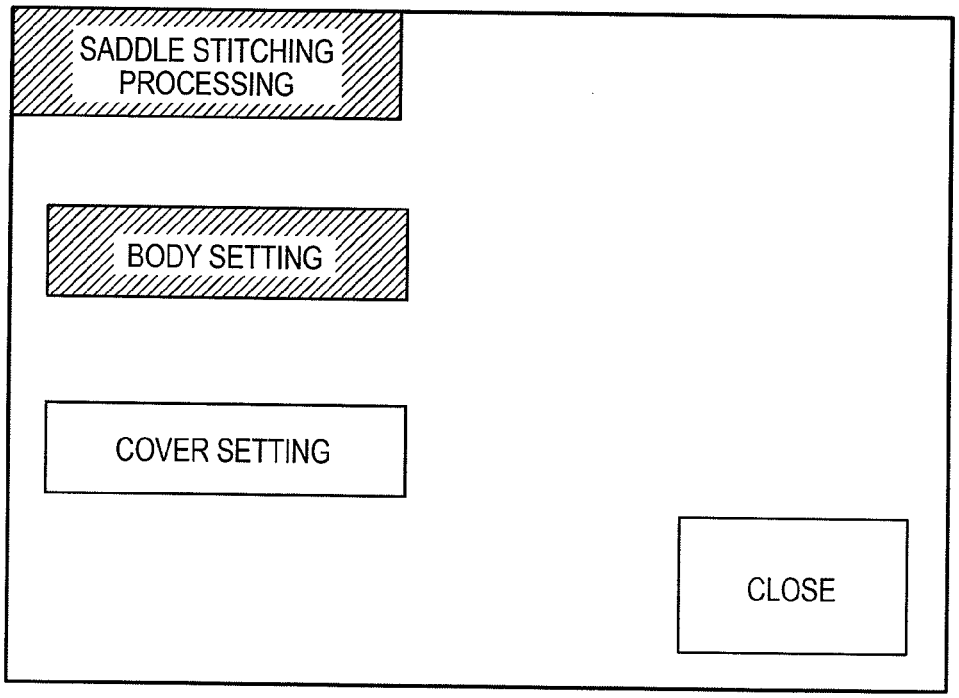

F I G. 15
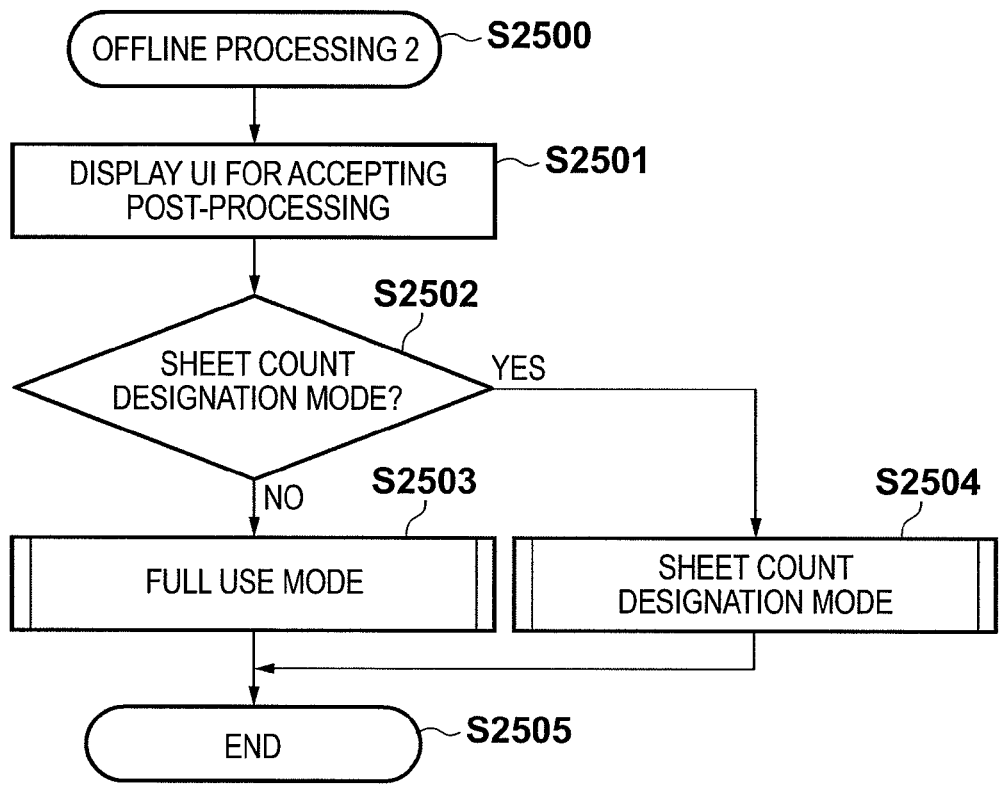

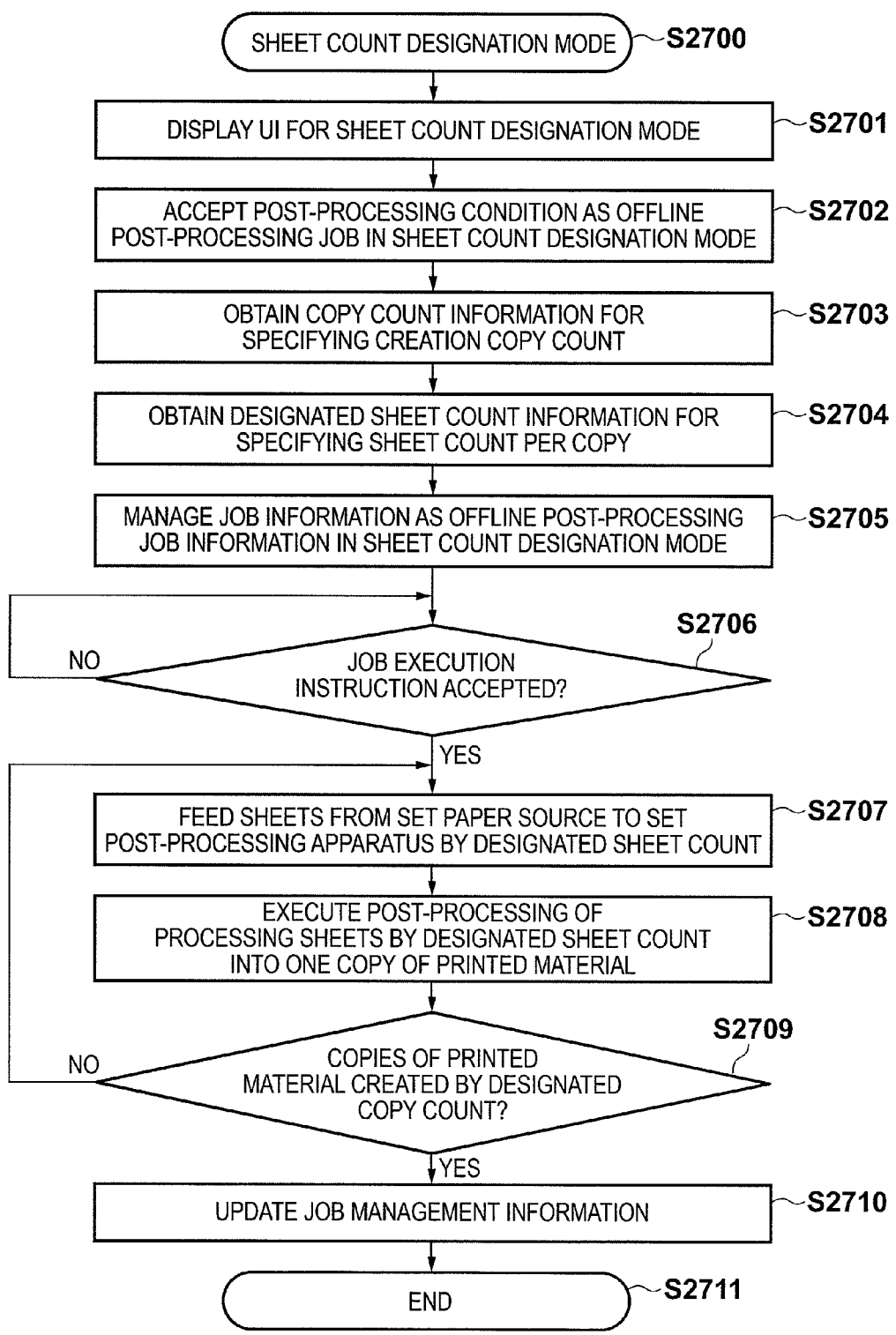

F I G. 27
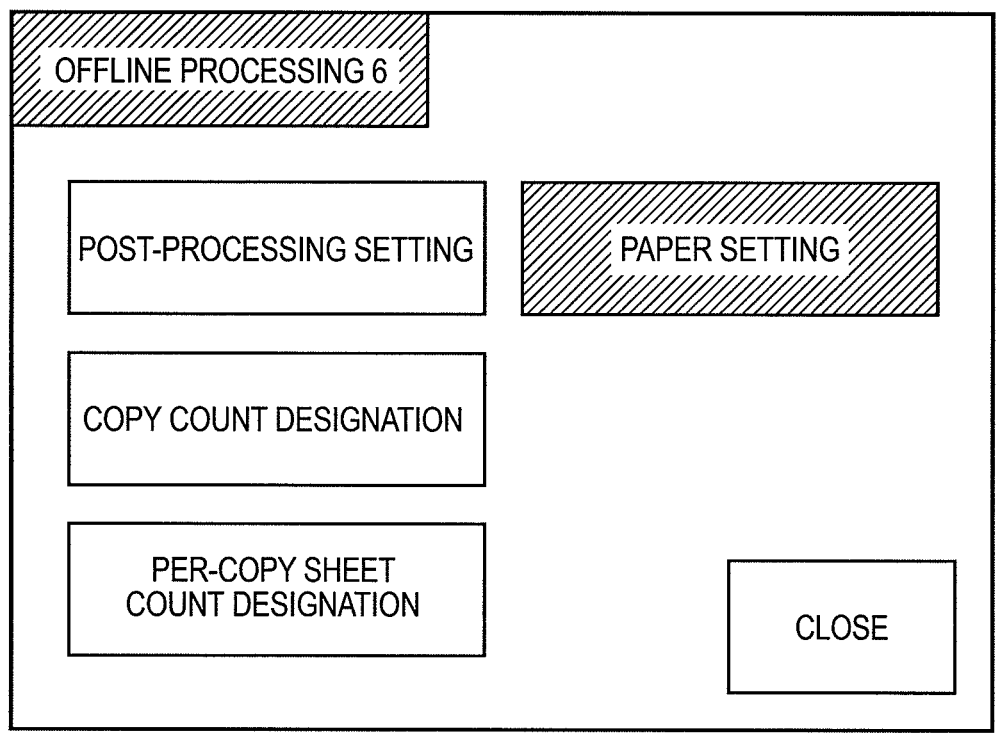

PRINTING SYSTEM, PRINTING SYSTEM CONTROL METHOD, AND RECORDING MEDIUM FOR SHEET PROCESSING

BACKGROUND OF THE INVENTION

1. Field of the Invention

The present invention relates to a printing system, printing system control method, and recording medium.

2. Description of the Related Art

There has conventionally been proposed a print on demand (POD) printing system using an electrophotographic or inkjet printing apparatus (see U.S. Patent Application Publication No. 2004-0190057). Such a printing system eliminates the need for an offset plate making process and other complicated processes. By using this printing system, a post-processing apparatus connected to a printing apparatus can perform post-processing for a sheet printed by the printing apparatus and output the processed sheet.

However, in the conventional printing system, even if the post-processing apparatus connected to the printing apparatus has a function of executing post-processing, it can execute post-processing only after the printing apparatus. The post-processing apparatus cannot execute post-processing using a sheet printed by another system or another printing apparatus.

SUMMARY OF THE INVENTION

The present invention provides a mechanism which enables the use of post-processing by a post-processing apparatus connected to a printing apparatus without printing by the printing apparatus.

According to one aspect of the present invention, there is provided a printing system capable of controlling a post-processing apparatus to execute post-processing for a sheet printed by a printing apparatus, comprising: an acceptance unit that accepts a post-processing execution request for executing post-processing by the post-processing apparatus without executing print processing by the printing apparatus; and a control unit that controls, in a case where the acceptance unit accepts the post-processing execution request, the post-processing apparatus to execute the post-processing for a sheet set in a supply source without executing print processing by the printing apparatus.

According to another aspect of the present invention, there is provided a method for controlling a printing system capable of controlling a post-processing apparatus to execute post-processing for a sheet printed by a printing apparatus, comprising: accepting a post-processing execution request for executing post-processing by the post-processing apparatus without executing print processing by the printing apparatus; and controlling, in a case where the post-processing execution request is accepted, the post-processing apparatus to execute the post-processing for a sheet set in a supply source without executing print processing by the printing apparatus.

The present invention allows the user to use post-processing by a post-processing apparatus connected to a printing apparatus without printing by the printing apparatus.

Further features of the present invention will become apparent from the following description of exemplary embodiments (with reference to the attached drawings).

BRIEF DESCRIPTION OF THE DRAWINGS

FIGS. 3A to 3C are sectional views showing the arrangement of the printing system 1000;

FIGS. 13A and 13B are schematic views each showing a UI;

FIG. 15 is a flowchart showing the overall processing sequence of post-processing according to the second embodiment;

FIG. 17 is a flowchart showing the detailed processing sequence of the sheet count designation mode (step S2504);

FIG. 27 is a schematic view showing a UI;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
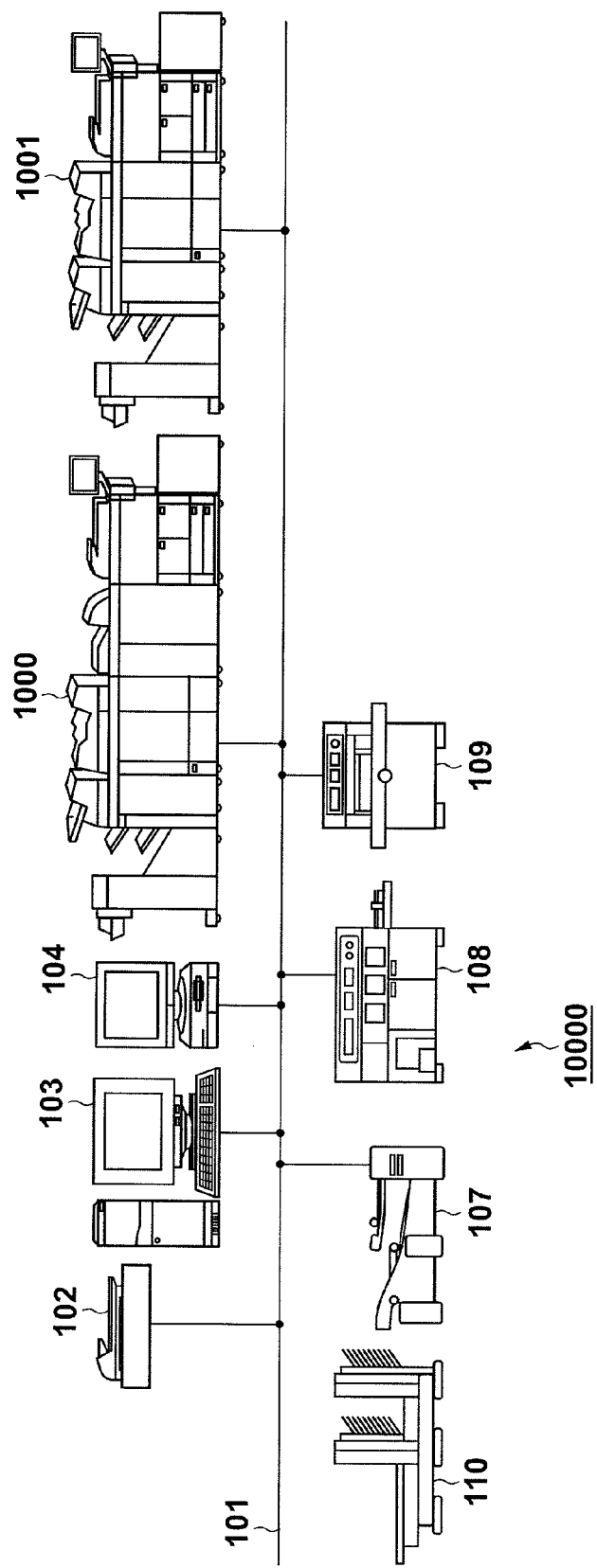
FIG. 1 is a view showing the overall configuration of a POD system 10000.

FIG. 1 is a view showing the configuration of a POD system 10000 including a printing system according to the present invention. The POD system 10000 in FIG. 1 includes a printing system 1000, printing system 1001, scanner 102, server computer (server PC) 103, and client computer (client PC) 104. The POD system 10000 also includes a sheet folding apparatus 107, case binding apparatus 108, sheet cutting apparatus 109, and saddle stitching apparatus 110. A plurality of apparatuses in the POD system 10000 except for the saddle stitching apparatus 110 are connected via a network 101, and can communicate data with each other.

Figure 2:
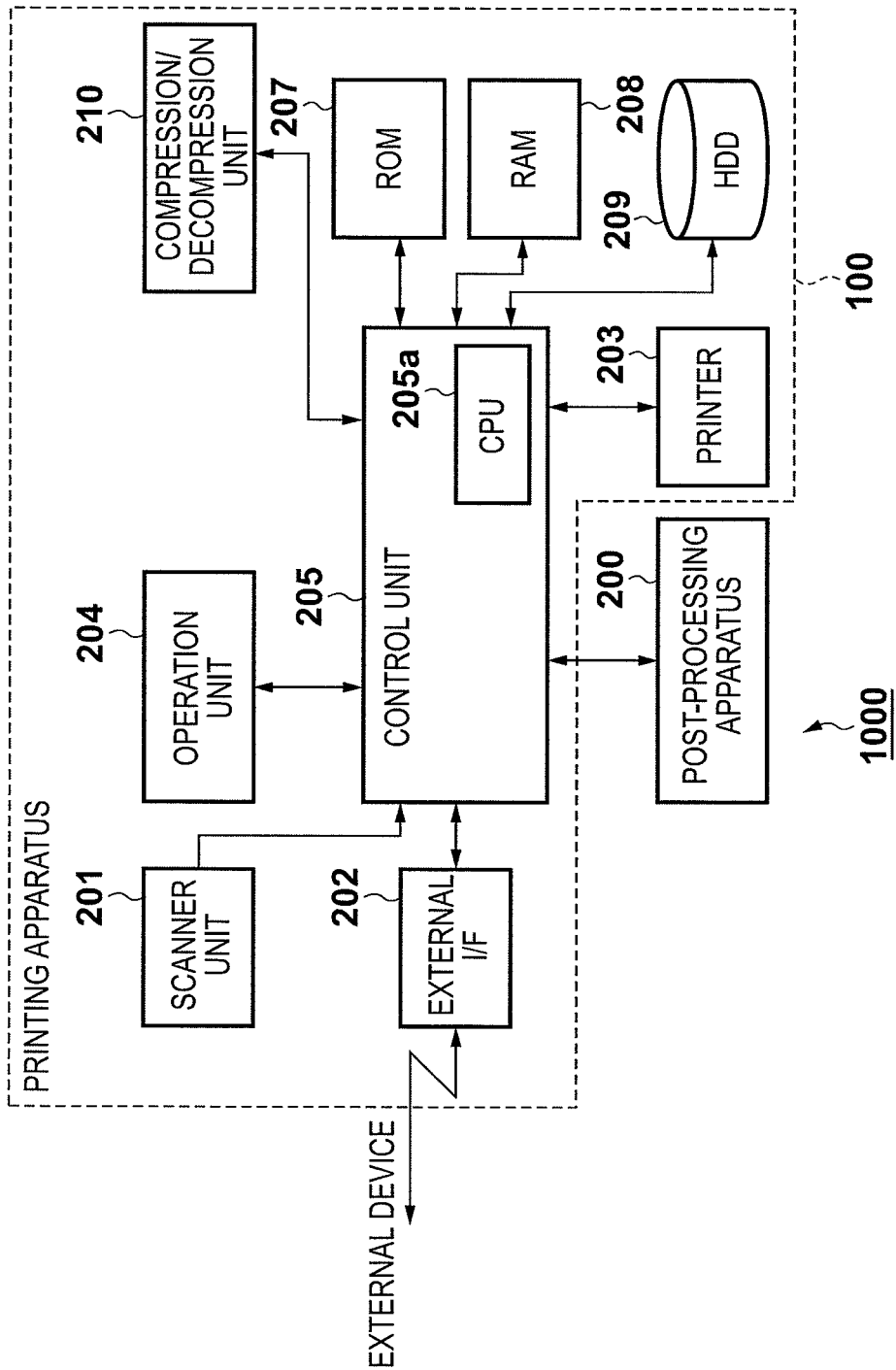
FIG. 2 is a block diagram showing the configuration of a printing system 1000.

FIG. 2 is a block diagram showing the configuration of the printing system 1000 according to the embodiment. The printing system 1000 includes a printing apparatus 100 and post-processing apparatus 200. As the printing apparatus 100, the embodiment will exemplify an MFP (Multi Function Peripheral) having a plurality of functions such as the copy function and printer function. However, the printing apparatus 100 may also be a single-function printing apparatus (printer) having only the copy function or printer function. Note that the printing apparatus 100 includes the units of the printing system 1000 except for the post-processing apparatus 200. Further, the printing apparatus 100 allows connecting an arbitrary number of post-processing apparatuses 200.

The printing system 1000 can cause the post-processing apparatus 200 to execute post-processing for sheets printed by the printing apparatus 100. The post-processing apparatus 200 is configured to be communicable with the printing apparatus 100. The post-processing apparatus 200 can receive an instruction from the printing apparatus 100, and execute various kinds of post-processing (also called sheet processing or finishing) to be described later.

The printing apparatus 100 includes a scanner unit 201, external I/F 202, printer 203, operation unit 204, control unit 205, ROM 207, RAM 208, HDD (Hard Disk Drive) 209, and compression/decompression unit 210. These units can transmit/receive commands and data to/from each other via a communication path such as a bus.

The scanner unit 201 scans an image on an original, converts it into image data, and transfers the image data to another unit. The external I/F 202 transmits/receives data between the printing apparatus 100 and other apparatuses connected to the network 101. The printer 203 prints an image based on input image data on a sheet.

Figure 5A:
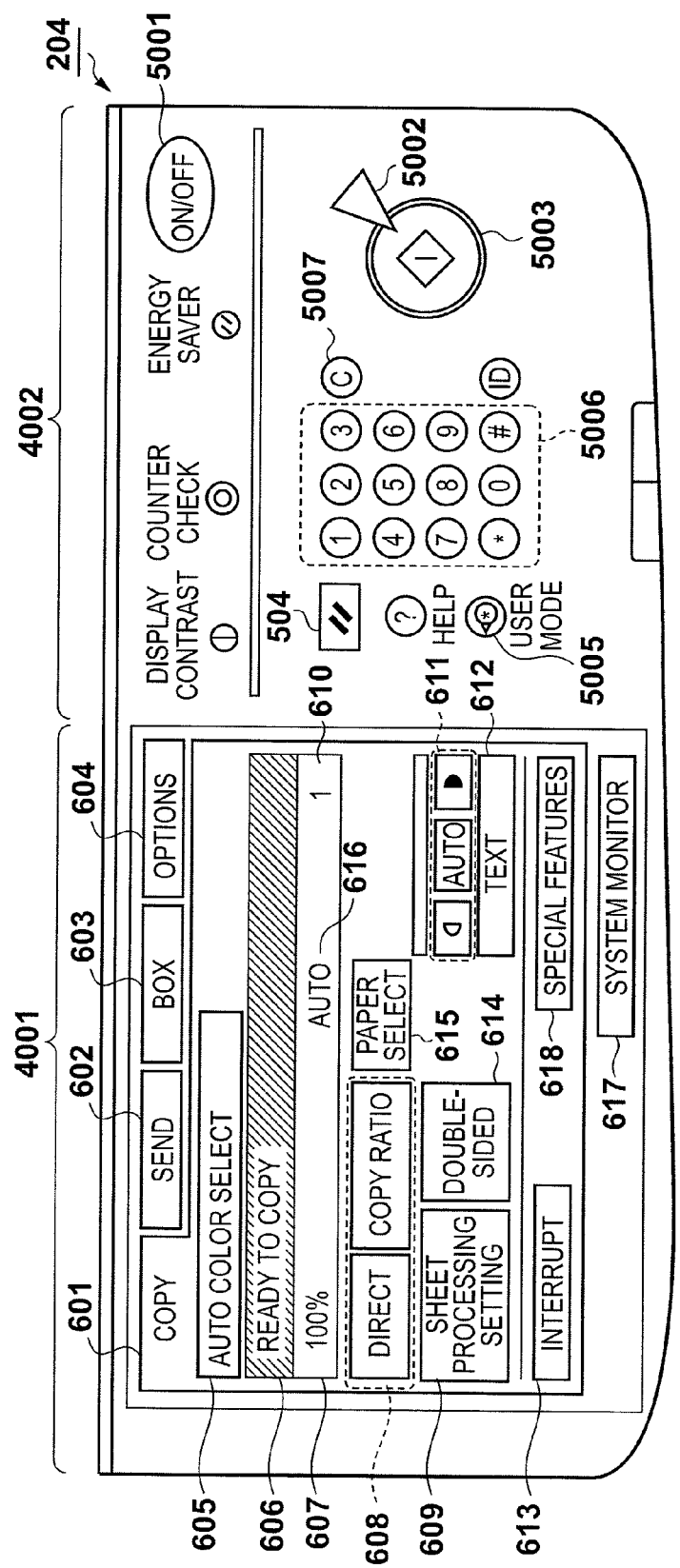
FIGS. 5A to 5C are views showing the arrangement of an operation unit and a UI.

As shown in FIG. 5A, the operation unit 204 includes a hard key input portion (key input portion) 4002 and touch panel portion (display unit) 4001 (to be described later), and accepts instructions (user operations) from the user via them. The operation unit 204 presents various displays on the touch panel portion 4001.

The control unit 205 includes a CPU 205a and comprehensively controls the processes, operations, and the like of various units of the printing system 1000. For example, the CPU 205a controls the operations of the printing apparatus 100 and post-processing apparatus 200 in the printing system 1000.

The ROM 207 stores various computer programs to be executed by the control unit 205. For example, the ROM 207 stores programs to cause the control unit 205 to execute various processes of flowcharts to be described later, and display control programs necessary to display various setting screens to be described later. The ROM 207 also stores a program for executing an operation of interpreting, by the control unit 205, PDL (Page Description Language) code data received from the server PC 103, client PC 104, or the like, and rasterizing it into raster image data. In addition, the ROM 207 stores a boot sequence, font information, and the like.

The RAM 208 is used as the work area of the control unit 205. For example, the RAM 208 stores image data sent from the scanner unit 201 and external I/F 202, various programs loaded from the ROM 207, and setting information. The RAM 208 also stores various kinds of information about the post-processing apparatus 200 (management information such as the number of post-processing apparatuses 200 connected to the printing apparatus 100, information about the functions of each post-processing apparatus 200, and the connecting order of the post-processing apparatuses 200). Note that the control unit 205 performs write of data in the RAM 208 and read of data from the RAM 208.

The HDD 209 includes a hard disk, and a driving unit for reading/writing data from/in the hard disk. For example, the HDD 209 stores image data input from the scanner unit 201 and external I/F 202, and various programs to be executed by the control unit 205.

The control unit 205 controls the printer 203 to print image data stored in the HDD 209 based on an instruction from the user. Also, the control unit 205 controls to transmit image data stored in the HDD 209 to an external apparatus such as the server PC 103 via the external I/F 202 based on an instruction from the user. The compression/decompression unit 210 compresses/decompresses image data and the like stored in the RAM 208 and HDD 209 according to various compression methods such as JBIG and JPEG.

In the embodiment, the post-processing apparatus 200 is applied to perform post-processing for sheets printed by the printing apparatus 100. In addition, the post-processing apparatus 200 can perform post-processing even for sheets printed by another printing system 1001.

FIG. 3A is a sectional view showing the printing apparatus 100 and the post-processing apparatuses 200 connected to the printing apparatus 100. An automatic document feeder (ADF) 330 separates a bundle of original sheets set on the support surface of an original tray in order of pages from the first page, and feeds each original sheet to an original table glass in order to scan it by a scanner 302. The scanner 302 scans the image of the original sheet conveyed onto the original table glass, and converts it into image data using a CCD. A ray such as a laser beam modulated in accordance with the image data strikes a rotary polyhedral mirror (for example, polygon mirror) 303, and the reflected scanning light irradiates a photosensitive drum 304 via a reflecting mirror. A latent image formed by the laser beam on the photosensitive drum 304 is developed with toner, and the toner image is transferred onto a sheet material held on a transfer drum 305. The series of image forming processes is executed sequentially with yellow (Y), magenta (M), cyan (C), and black (K) toners, forming a full-color image on the sheet material. After the four image forming processes, the sheet material bearing the full-color image on the transfer drum 305 is separated by a separation gripper 306, and conveyed to a fixing unit 308 by a pre-fixing conveyor 307. The fixing unit 308 is formed from a combination of rollers and a belt, and incorporates a heat source such as a halogen heater. The fixing unit 308 fuses and fixes, by heat and pressure, toner on a sheet material bearing a toner image. A discharge flapper 309 is swingable about the swing shaft, and regulates the sheet material conveyance direction. When the discharge flapper 309 swings clockwise in FIG. 3A, a sheet is conveyed straight, and discharged outside the apparatus by discharge rollers 310. The control unit 205 controls the printing apparatus 100 to execute single-sided printing according to this sequence.

When forming images on the two surfaces of a sheet, the discharge flapper 309 swings counterclockwise in FIG. 3A. The course of the sheet changes downward, and the sheet is supplied to a double-sided conveyor. The double-sided conveyor includes a reverse flapper 311, reverse rollers 312, a reverse guide 313, and a double-sided tray. The reverse flapper 311 swings about the swing shaft and regulates the sheet conveyance direction. To process a double-sided print job, the control unit 205 controls the reverse flapper 311 to swing counterclockwise in FIG. 3A and supply a sheet having the first surface printed by the printer 203 to the reverse guide 313 via the reverse rollers 312. While clamping the trailing end of the sheet, the reverse rollers 312 temporarily stop, and the reverse flapper 311 swings clockwise in FIG. 3A. Then, the reverse rollers 312 rotate backward. The sheet is switched back and conveyed to replace its trailing and leading ends, and is guided to the double-sided tray. The double-sided tray temporarily supports the sheet, and refeed rollers 315 supply the sheet again to registration rollers 316. At this time, the sheet travels with a surface opposite to the first surface in the transfer step facing the photosensitive drum. Similar to the above-described process, the second image is formed on the second surface of the sheet. After the images are formed on the two surfaces of the sheet, the sheet undergoes the fixing step and is discharged outside from the main body of the printing apparatus 100 via the discharge rollers 310. The control unit 205 controls the printing apparatus 100 to execute double-sided printing according to this sequence.

The printing apparatus 100 also includes paper feed units which store sheets necessary for print processing. The paper feed units are, for example, paper cassettes 317 and 318 (each capable of containing, for example, 500 sheets), a paper deck 319 (capable of containing, for example, 5,000 sheets), and a manual feed tray 320. The paper cassettes 317 and 318 and the paper deck 319 allow setting various kinds of sheets different in size and material in distinction from each other in the respective paper feed units. The manual feed tray 320 allows setting various kinds of sheets including a special sheet such as an OHP sheet. The paper cassettes 317 and 318, paper deck 319, and manual feed tray 320 include pickup rollers, and the pickup rollers feed sheets successively one by one.

The post-processing apparatuses 200 shown in FIG. 3A will be explained. The printing system 1000 according to the embodiment allows coupling an arbitrary number of post-processing apparatuses 200 of arbitrary types on condition that sheets can be conveyed from an upstream apparatus to a downstream apparatus via a sheet conveyance path. For example, as shown in FIG. 3A, a large-volume stacker 200-3a, inserter 200-3d, glue binding apparatus 200-3b, and saddle stitching apparatus 200-3c can be coupled in the order named from the vicinity of the printing apparatus 100, and selectively used in the printing system 1000. Each post-processing apparatus 200 includes a sheet discharge portion, and the user can take processed sheets out of the sheet discharge portion of each post-processing apparatus.

The arrangements of the respective post-processing apparatuses will be explained with reference to FIGS. 3B, 3C, 4A, and 4B. FIG. 3B is an enlarged sectional view showing the arrangement of the large-volume stacker 200-3a. The large-volume stacker 200-3a has an escape path, straight path, and stack path as sheet conveyance paths. The large-volume stacker 200-3a includes a dolly which can be set in the large-volume stacker. The dolly supports a stacker tray via an extensible stay.

When executing large-volume stacking processing for sheets printed by the printing apparatus 100, the control unit 205 controls to discharge sheets printed by the printing apparatus 100 onto the stacker tray via the stack path. As sheets are discharged onto the stacker tray, the control unit 205 contracts the extensible stay so that the top of sheets stacked on the stacker tray becomes flush with the discharge port of the stack path. Accordingly, sheets discharged from the stack path can be stacked on the stacker tray.

The large-volume stacker has a front door (not shown), and the user can dismount the dolly together with the stacker tray by opening the front door. By using the dolly, the user can easily convey sheets stacked on the stacker tray to another apparatus.

FIG. 3C is an enlarged sectional view showing the arrangement of the inserter 200-3d. The inserter 200-3d has a straight path and escape path as sheet conveyance paths. The inserter 200-3d further includes an escape tray, paper deck 1, paper deck 2, and paper deck 3. Sheets of various sizes can be set on the paper decks 1 to 3. The control unit 205 controls to feed a sheet from one of paper decks 1 to 3, and convey it to a downstream post-processing apparatus.

For example, the user can set a sheet he wants to insert in the inserter 200-3d, and insert it between sheets printed by the printing apparatus 100. Also, the inserter 200-3d can convey a sheet traveling from an upstream apparatus (large-volume stacker in the apparatus arrangement shown in FIG. 3A) to a downstream apparatus via the straight path.

Figure 4A:
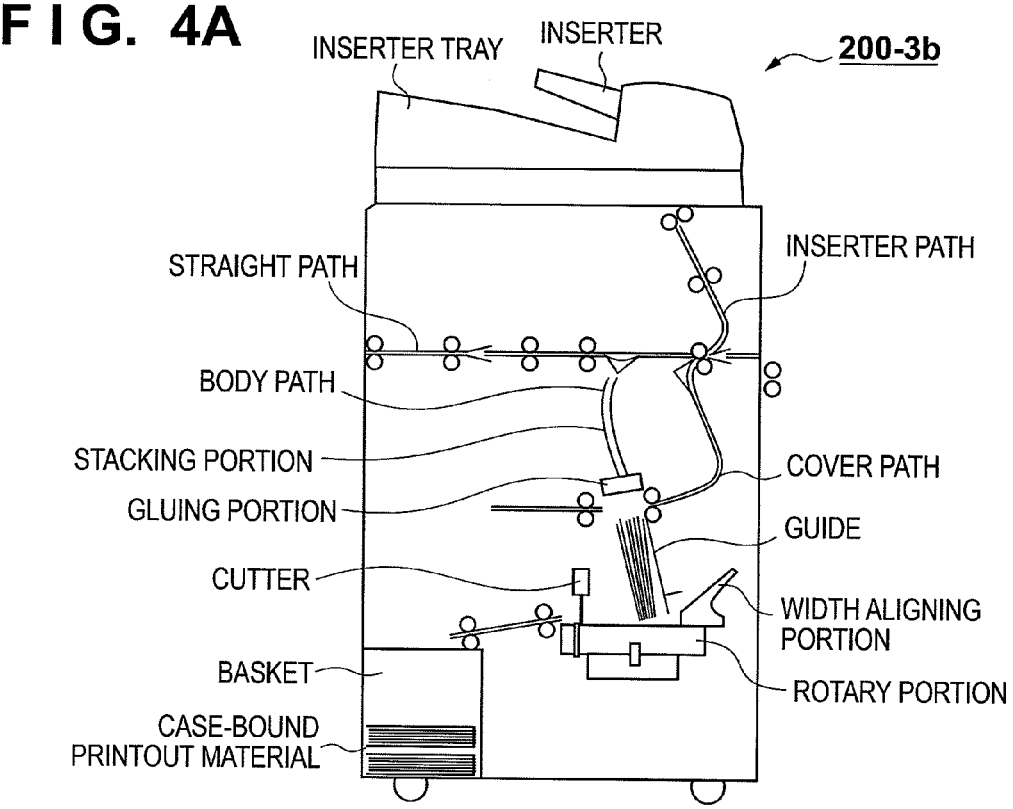
FIGS. 4A and 4B are sectional views showing the arrangement of the printing system 1000.

FIG. 4A is an enlarged sectional view showing the arrangement of the glue binding apparatus 200-3b. The glue binding apparatus 200-3b selectively conveys a sheet traveling from an upstream apparatus (inserter 200-3d in the apparatus arrangement shown in FIG. 3A) to three conveyance paths, that is, a cover path, body path, and straight path. The glue binding apparatus 200-3b has an inserter path. The inserter path is a sheet conveyance path for conveying a sheet set on the inserter tray to the cover path.

The straight path of the glue binding apparatus 200-3b shown in FIG. 4A is a sheet conveyance path for conveying, to a subsequent apparatus, a sheet of a job which does not require glue binding processing by the glue binding apparatus 200-3b. The body path and cover path of the glue binding apparatus 200-3b shown in FIG. 4A are sheet conveyance paths for conveying a sheet necessary to create a case-bound printed material.

For example, when creating a case-bound printed material using the glue binding apparatus 200-3b, the control unit 205 controls the printer 203 to print target body image data on body sheets of the case-bound printed material. When creating one copy of a case-bound printed material, a bundle of body sheets for one copy is wrapped with one cover. A bundle of body sheets will be called a "body".

The control unit 205 controls to convey sheets printed as a body by the printing apparatus 100 to the body path shown in FIG. 4A. When performing case binding processing, the control unit 205 executes processing of wrapping the body printed by the printing apparatus 100 with a cover sheet conveyed via the cover path.

For example, the control unit 205 controls to sequentially stack, on a stacking portion via the body path in FIG. 4A, body sheets conveyed from an upstream apparatus. After body data-printed sheets are stacked on the stacking portion by the number of sheets of one copy, the control unit 205 controls to convey one cover sheet necessary for the job via the cover path. The control unit 205 controls a gluing portion in FIG. 4A to glue the spine of the sheet bundle of one set serving as the body. After that, the control unit 205 controls to join the spine of the body and the center of the cover by the gluing portion. When joining the body to the cover, the body is conveyed and pressed downward in the apparatus. Accordingly, the cover is folded to wrap the body with one cover. The sheet bundle of one set is then stacked on a turntable (rotary portion) in FIG. 4A along the guide.

After setting the sheet bundle of one set on the turntable, the control unit 205 controls a cutter to cut the sheet bundle. At this time, the cutter can execute three-edge cutting processing of cutting three edges of the sheet bundle of one set except for an edge serving as the spine. The control unit 205 controls to push the sheet bundle having undergone three-edge cutting processing toward a basket using a width aligning portion, and store it in the basket.

In addition to processing sheets conveyed from an upstream apparatus, the glue binding apparatus can perform case binding processing or pad binding processing for sheets fed from the inserter tray. For example, a case in which case binding processing is executed for sheets fed from the inserter tray will be explained. The operator sets sheets to be processed on the inserter tray shown in FIG. 4A. The control unit 205 controls to feed the sheets set on the inserter tray as a body by using an inserter shown in FIG. 4A. Then, the control unit 205 controls to convey the body sheets to the body path shown in FIG. 4A. Next, the control unit 205 controls to convey a cover sheet similarly fed from the inserter tray via the cover path, and wrap the body sheets. The glue binding apparatus 200-3b can also perform case binding processing or pad binding processing for sheets fed from the inserter 200-3d.

Figure 4B:
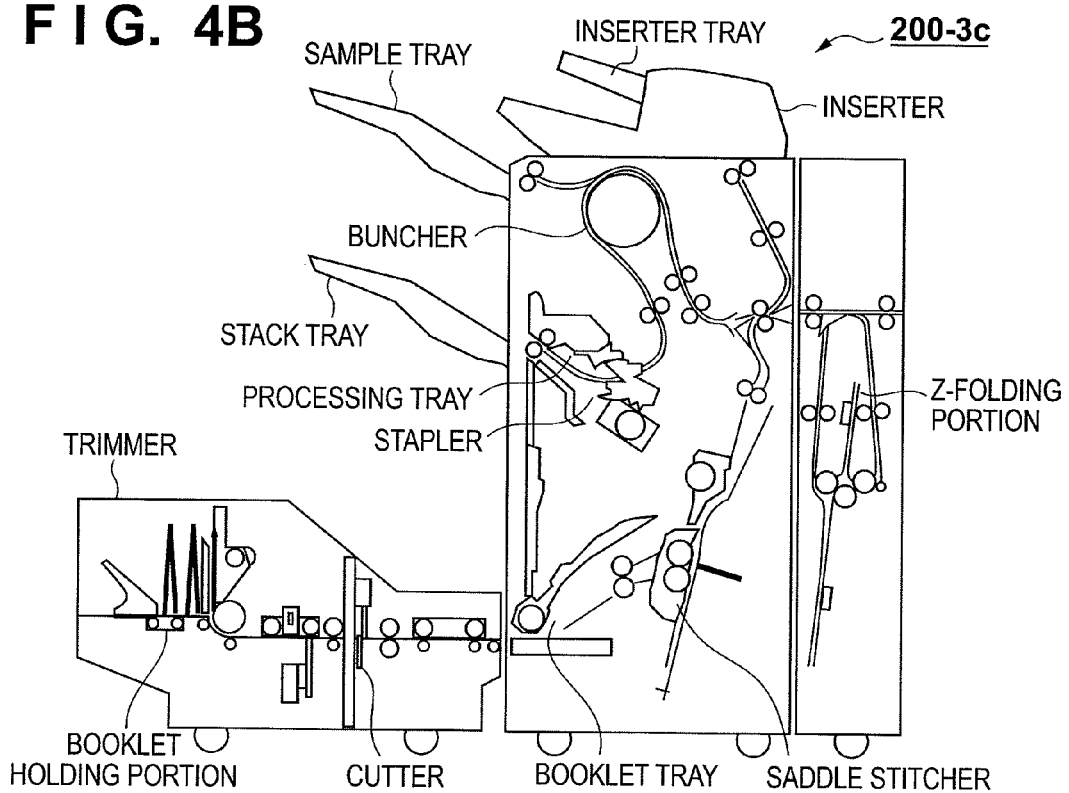

FIG. 4B is a sectional view showing the arrangement of the saddle stitching apparatus 200-3c. The saddle stitching apparatus 200-3c includes various units which selectively execute stapling processing, cutting processing, punching processing, Z-folding processing, shift discharge processing, saddle stitching processing, and the like for sheets from the printing apparatus 100. The saddle stitching apparatus 200-3c does not have a straight path serving as a sheet conveyance function to a subsequent apparatus. For this reason, when connecting a plurality of sheet processing apparatuses to the printing apparatus 100, the saddle stitching apparatus 200-3c is connected at the end, as shown in FIG. 3A. As shown in FIG. 4B, a sample tray and stack tray are arranged outside the saddle stitching apparatus 200-3c, and a booklet tray is arranged inside.

When the control unit 205 receives an instruction to staple sheets by the saddle stitching apparatus 200-3c, it controls to sequentially stack sheets printed by the printing apparatus 100 on a processing tray inside the saddle stitching apparatus 200-3c. When sheets of one bundle are stacked on the processing tray, the control unit 205 controls a stapler to staple them. Thereafter, the control unit 205 controls to discharge the stapled sheet bundle from the processing tray to the stack tray in FIG. 4B.

When executing a job for which the control unit 205 has received an instruction to Z-fold sheets by the saddle stitching apparatus 200-3c, the control unit 205 controls a Z-folding portion to fold, in a Z shape, sheets printed by the printing apparatus 100. The control unit 205 controls to convey the folded sheets through the saddle stitching apparatus 200-3c and discharge them onto the discharge tray such as the stack tray or sample tray.

When the control unit 205 receives an instruction to set punching processing by the saddle stitching apparatus 200-3c, it controls a puncher to punch sheets printed by the printing apparatus 100. The control unit 205 controls to convey the punched sheets through the saddle stitching apparatus 200-3c and discharge them onto the discharge tray such as the stack tray or sample tray.

When executing a job for which the control unit 205 has received an instruction to perform saddle stitching processing by the saddle stitching apparatus 200-3c, the control unit 205 controls a saddle stitcher to stitch a bundle of sheets of one set at two center portions. Then, the control unit 205 controls rollers to grip the center of the sheet bundle and fold the sheets into two from the center. As a result, a booklet like a brochure can be created. The sheet bundle having undergone saddle stitching processing by the saddle stitcher is conveyed to the booklet tray.

When the control unit 205 accepts an instruction to perform cutting processing for a job for which it has received an instruction to perform saddle stitching processing, it controls to convey a saddle-stitched sheet bundle from the booklet tray to a trimmer. The control unit 205 then controls a cutter to cut the sheet bundle conveyed to the trimmer and a booklet holding portion to hold the sheet bundle. Even the saddle stitching apparatus 200-3c in FIG. 4B can execute three-edge cutting for a saddle-stitched sheet bundle.

When the saddle stitching apparatus 200-3c does not include the trimmer, the user can take out a sheet bundle bound by the saddle stitcher from the booklet tray. If necessary, the saddle stitching apparatus 200-3c attaches a sheet set on the inserter tray in FIG. 4B to sheets conveyed from the printing apparatus 100. In addition to processing sheets conveyed from an upstream apparatus, the saddle stitching apparatus 200-3c can perform stapling processing, cutting processing, punching processing, Z-folding processing, shift discharge processing, saddle stitching processing, and the like for sheets fed from the inserter tray. For example, sheets printed in advance can be set on the inserter tray and undergo saddle stitching processing.

However, as shown in FIG. 4B, the saddle stitching apparatus 200-3c does not have a path to convey a sheet fed from the inserter tray to the Z-folding portion, and cannot Z-fold a sheet fed from the inserter tray.

When the user wants to Z-fold a sheet printed in advance, he sets the sheet in the inserter 200-3d and feeds it. Accordingly, a sheet requiring no printing by the printing apparatus 100 can be Z-folded. The saddle stitching apparatus 200-3c can execute even processing other than Z-folding processing (for example, stapling processing, punching processing, Z-folding processing, shift discharge processing, or saddle stitching processing) for a sheet in the inserter 200-3d.

The arrangement of the operation unit 204 shown in FIG. 2 will be explained with reference to FIG. 5A. The operation unit 204 includes the touch panel portion 4001 and key input portion 4002. The touch panel portion 4001 is formed from an LCD (Liquid Crystal Display) and a transparent electrode adhered on it. The touch panel portion 4001 displays various setting screens for accepting an instruction from the user. The touch panel portion 4001 has both a function of displaying various screens and an instruction input function of accepting an instruction from the user. The key input portion 4002 includes a power key 5001, start key 5003, stop key 5002, user mode key 5005, and ten-key pad 5006. The start key 5003 is used to cause the printing apparatus 100 to start execution of a copy job or send job. The user mode key 5005 is used to make various device settings. The ten-key pad 5006 is used to set a numerical input such as the copy count. The control unit 205 controls the printing system 1000 to perform various processes based on user instructions accepted via various screens displayed on the touch panel portion 4001 and user instructions accepted via the key input portion 4002.

The touch panel portion 4001 shown in FIG. 5A displays a standard screen for the copy function. The standard screen includes buttons such as a double-sided button 614 and paper select button 615. The user presses these buttons to make various settings. By pressing a sheet processing setting button 609, the user can set sheet processing to be executed using the post-processing apparatus 200. When the user presses the sheet processing setting button 609, the control unit 205 controls the touch panel portion 4001 to display a screen shown in FIG. 5B.

Figure 5B:
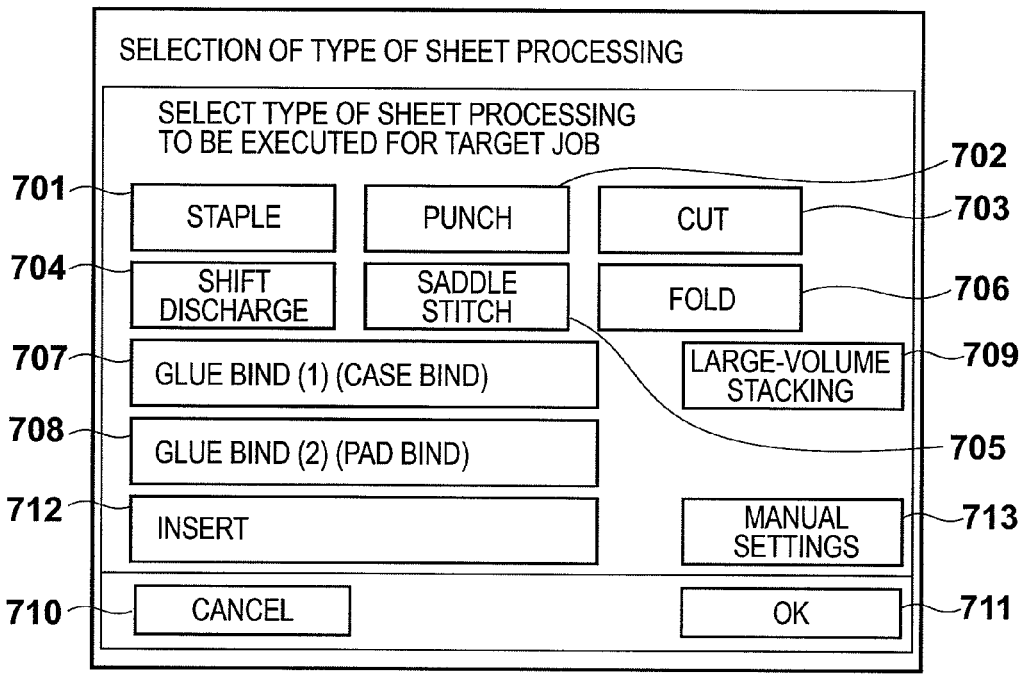

The screen shown in FIG. 5B includes a stapling key 701, a punching key 702, a cutting key 703, a shift discharge key 704, a saddle stitching key 705, a folding key 706, glue binding keys 707 and 708, and an insertion processing key 712. The control unit 205 controls a memory such as the RAM 208 to hold settings accepted via the screen shown in FIG. 5B as job settings.

The stapling key 701 is used to cause the saddle stitching apparatus 200-3c to execute stapling of binding sheets with staples. The punching key 702 is used to cause the saddle stitching apparatus 200-3c to execute punching processing of punching sheets. The cutting key 703 is used to cause the saddle stitching apparatus 200-3c to execute cutting processing for sheets. The shift discharge key 704 is used to cause the large-volume stacker 200-3a to execute shift discharge processing of discharging sheets to the stacker tray while shifting them. The saddle stitching key 705 is used to cause the saddle stitching apparatus 200-3c to execute saddle stitching processing for sheets. The folding key 706 is used to cause the saddle stitching apparatus 200-3c to execute folding processing for sheets. The glue binding key 707 is used to cause the glue binding apparatus 200-3b to execute case binding processing for sheets. The glue binding key 708 is used to cause the glue binding apparatus 200-3b to execute case binding processing for sheets. A large-volume stacking processing key 709 is used to cause the large-volume stacker 200-3a to execute large-volume stacking processing of discharging sheets onto the stacker tray. The insertion processing key 712 is used to cause the inserter 200-3d to execute insertion processing of inserting a sheet at an arbitrary portion between a plurality of sheets printed by the printing apparatus 100. A cancel key 710 is used to return the display to the screen shown in FIG. 5A without reflecting contents set on the screen shown in FIG. 5B as job settings. An OK key 711 is used to return the display to the screen shown in FIG. 5A while contents set on the screen shown in FIG. 5B are held as job settings in the RAM 208.

As described above, sheet processing accepted via the screen shown in FIG. 5B is executed for sheets printed by the printing apparatus 100. For example, when the user presses the OK key 711 while selecting the saddle stitching key 705 and a job execution start instruction is accepted in response to the start key 5003, the control unit 205 performs the following control. The control unit 205 controls the scanner unit 201 to scan image data of an original and the printing apparatus 100 to print the image data. The control unit 205 controls to convey printed sheets to the saddle stitching apparatus 200-3c and execute saddle stitching processing by the saddle stitching apparatus 200-3c. As a result, the user can obtain sheets which have been saddle-stitched after printing image data of the original.

For example, when the user presses the OK key 711 while selecting the large-volume stacking processing key 709 and a job execution start instruction is accepted in response to the start key 5003, the control unit 205 performs the following control. The control unit 205 controls the scanner unit 201 to scan image data of an original and the printing apparatus 100 to print the image data. The control unit 205 controls to convey sheets printed by the printing apparatus 100 to the large-volume stacker 200-3a and discharge them onto the stacker tray of the large-volume stacker 200-3a. With the dolly, the user can easily carry a large volume of sheets stacked on the stacker tray after printing image data of the original.

As described above, sheet processing set on the screen shown in FIG. 5B is done for sheets printed by the printing apparatus 100. However, if sheet processing can be accepted only for sheets printed by the printing apparatus 100, sheet processing such as saddle stitching processing cannot be performed singly without printing by the printing apparatus 100. For example, the user cannot execute sheet processing such as saddle stitching processing for sheets printed in advance using the printing system 1000. To solve this, the embodiment enables execution of post-processing by the post-processing apparatus for sheets via a screen shown in FIG. 5C without printing by the printing apparatus 100.

Figure 5C:
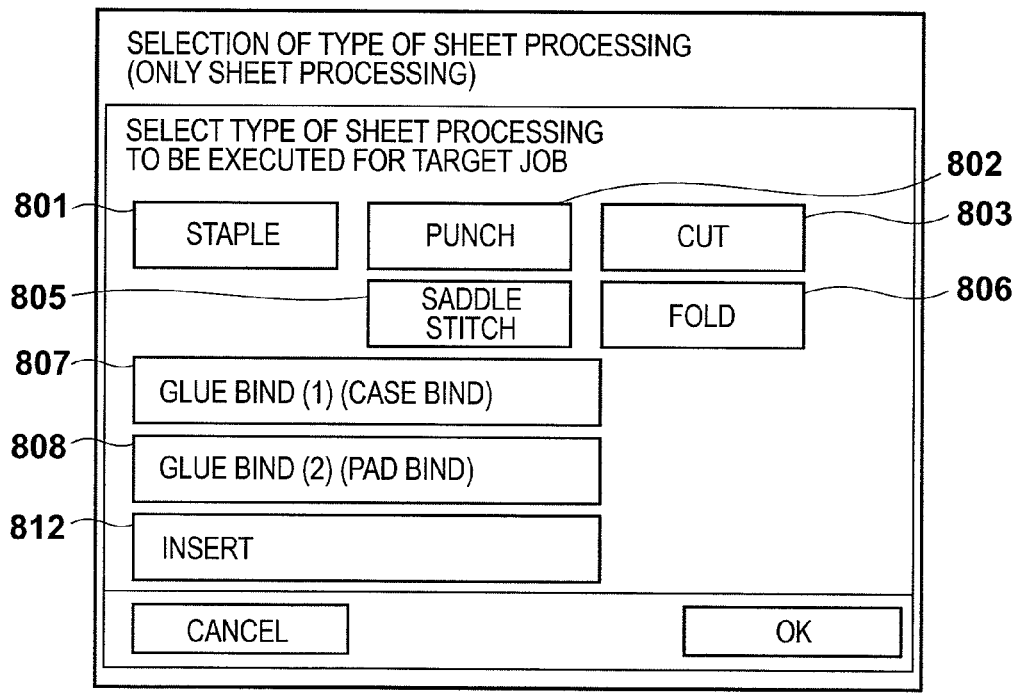

The screen shown in FIG. 5C includes a stapling key 801, a punching key 802, a cutting key 803, a saddle stitching key 805, a folding key 806, glue binding keys 807 and 808, and an insertion processing key 812. The control unit 205 controls a memory such as the RAM 208 to hold settings accepted via the screen shown in FIG. 5C as job settings.

The stapling key 801 is used to cause the saddle stitching apparatus 200-3c to execute stapling of binding sheets with staples. The punching key 802 is used to cause the saddle stitching apparatus 200-3c to execute punching processing of punching sheets. The cutting key 803 is used to cause the saddle stitching apparatus 200-3c to execute cutting processing for sheets. The saddle stitching key 805 is used to cause the saddle stitching apparatus 200-3c to execute saddle stitching processing for sheets. The folding key 806 is used to cause the saddle stitching apparatus 200-3c to execute folding processing for sheets. The glue binding key 807 is used to cause the glue binding apparatus 200-3b to execute case binding processing for sheets. The glue binding key 808 is used to cause the glue binding apparatus 200-3b to execute case binding processing for sheets. The insertion processing key 812 is used to cause the inserter 200-3d to execute insertion processing of inserting a sheet at an arbitrary portion between a plurality of sheets printed by the printing apparatus 100. As described above, sheet processing accepted via the screen shown in FIG. 5C is executed without printing by the printing apparatus 100.

When the user presses the OK key 711 while selecting the saddle stitching key 705 and a job execution start instruction is accepted in response to the start key 5003, the control unit 205 performs the following control. The control unit 205 controls to feed a sheet from a designated paper feed portion such as paper cassette 1, 2, or 3 of the inserter 200-3d or the inserter tray of the saddle stitching apparatus 200-3c. Then, the control unit 205 controls to convey the fed sheet into the saddle stitching apparatus 200-3c and execute saddle stitching processing by the saddle stitching apparatus 200-3c. The user can obtain sheets which have been saddle-stitched after printing image data of the original. The user can set sheets, which have been printed in advance by another printing system 1001, on paper cassette 1, 2, or 3 of the inserter 200-3d or the inserter tray of the saddle stitching apparatus 200-3c, and execute saddle stitching processing.

The screen shown in FIG. 5C displays none of keys corresponding to the shift discharge key 704 and large-volume stacking processing key 709 shown in FIG. 5B. This is because the large-volume stacker 200-3a shown in FIG. 3A does not include the inserter tray and no sheet can be fed from paper cassettes 1 to 3 of the inserter 200-3d. Hence, neither shift discharge processing corresponding to the shift discharge key 704 nor large-volume stacking processing corresponding to the large-volume stacking processing key 709 can be executed for fed sheets. If a large-volume stacker is connected downstream of the inserter 200-3d in the printing system 1000, the shift discharge key 704 and large-volume stacking processing key 709 are displayed. In this manner, the control unit 205 can display, on the screen of FIG. 5C, a key corresponding to sheet processing which is executable without printing by the printing apparatus 100 in terms of the configuration of the printing system 1000.

(First Embodiment)

Figure 6:
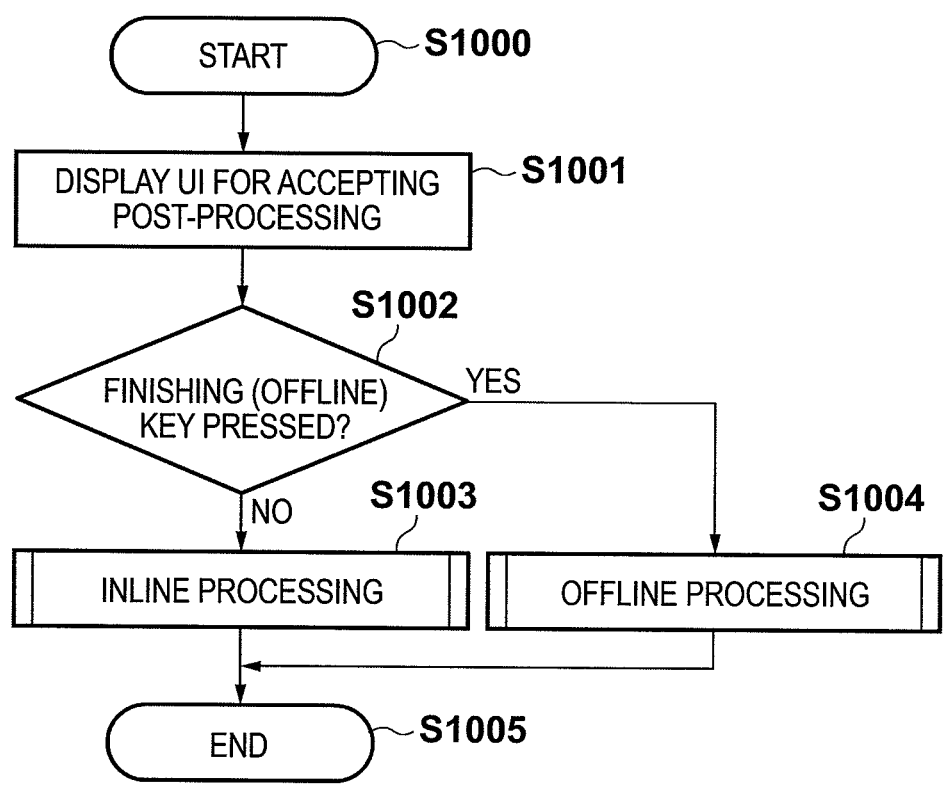
FIG. 6 is a flowchart showing the overall processing sequence of post-processing according to the first embodiment.
Figure 9A:
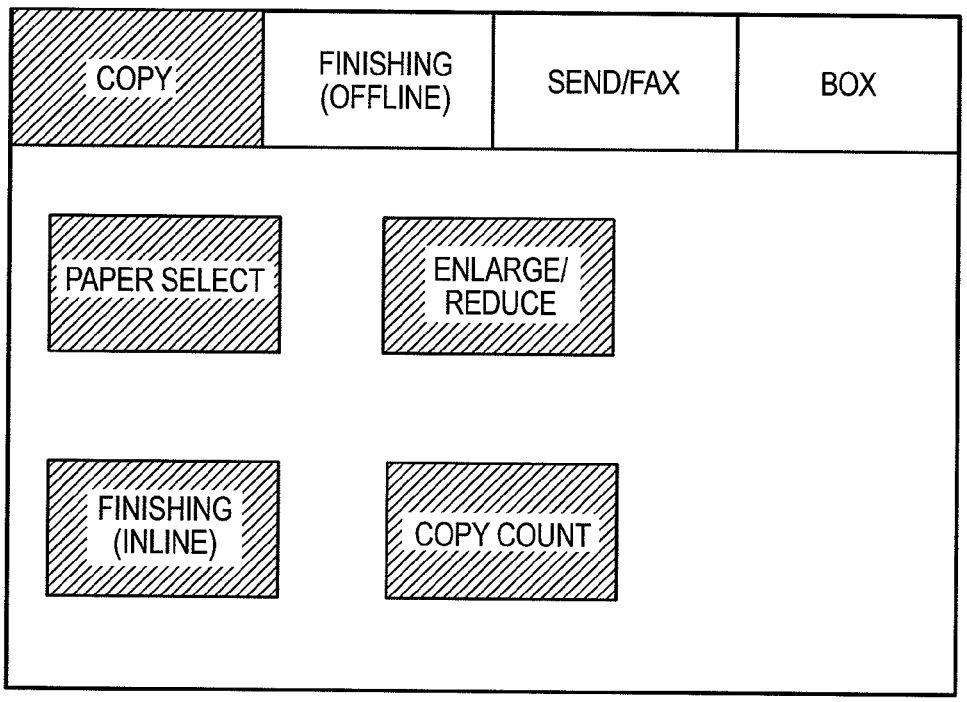
FIGS. 9A and 9B are schematic views each showing a UI.

The first embodiment will be explained with reference to the flowchart of FIG. 6. Note that a control unit 205 executes steps in this flowchart. In step S1000, the process starts. In step S1001, the control unit 205 displays a post-processing setting user interface (UI) screen (FIG. 9A) and determines, based on a user operation, which of an inline mode and offline mode is set to perform finishing processing (post-processing). Here, the control unit 205 functions as an acceptance unit, and accepts a job execution request to execute at least either print processing by a printing apparatus 100 or post-processing by a post-processing apparatus 200 connected to the printing apparatus 100. Settings designated on various UI screens to be described later function as job attribute information.

If the control unit 205 determines in step S1002 that the user has pressed a "finishing (offline)" tab on the post-processing setting UI screen (FIG. 9A), the process advances to step S1004 to perform finishing processing (offline processing) in the offline mode. If the user has not pressed the "finishing (offline)" tab on the post-processing setting UI screen (FIG. 9A), the process advances to step S1003 to perform finishing processing (inline processing) in the inline mode.

In step S1003, the control unit 205 performs inline processing. Details of inline processing will be described later with reference to the flowchart of FIG. 7. After the end of inline processing, the process advances to step S1005. In step S1004, the control unit 205 performs offline processing. Details of offline processing will be described later with reference to the flowchart of FIG. 8. After the end of offline processing, the process advances to step S1005. In step S1005, the process ends.

Figure 7:
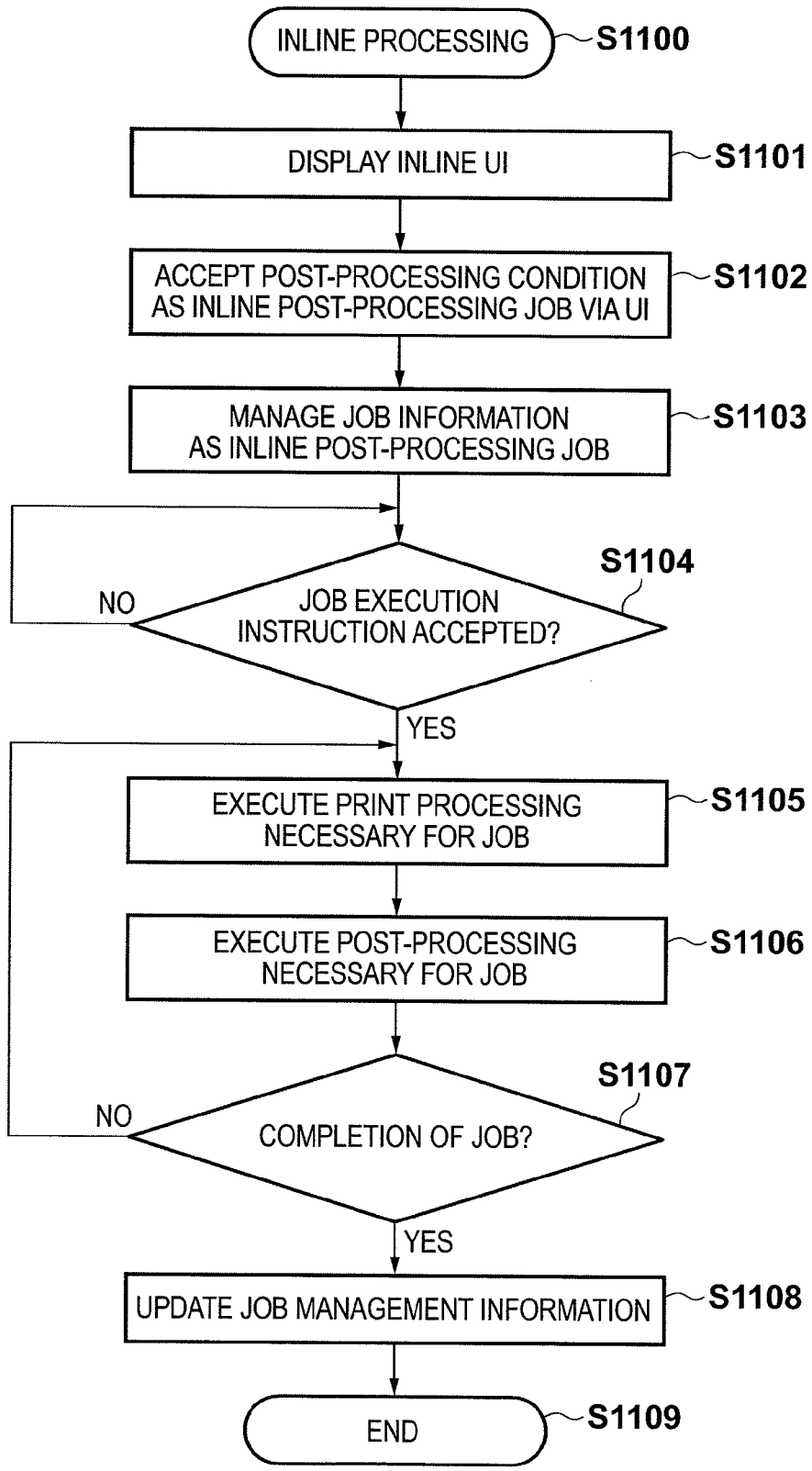
FIG. 7 is a flowchart showing the detailed processing sequence of inline processing (step S1003)
Figure 9B:
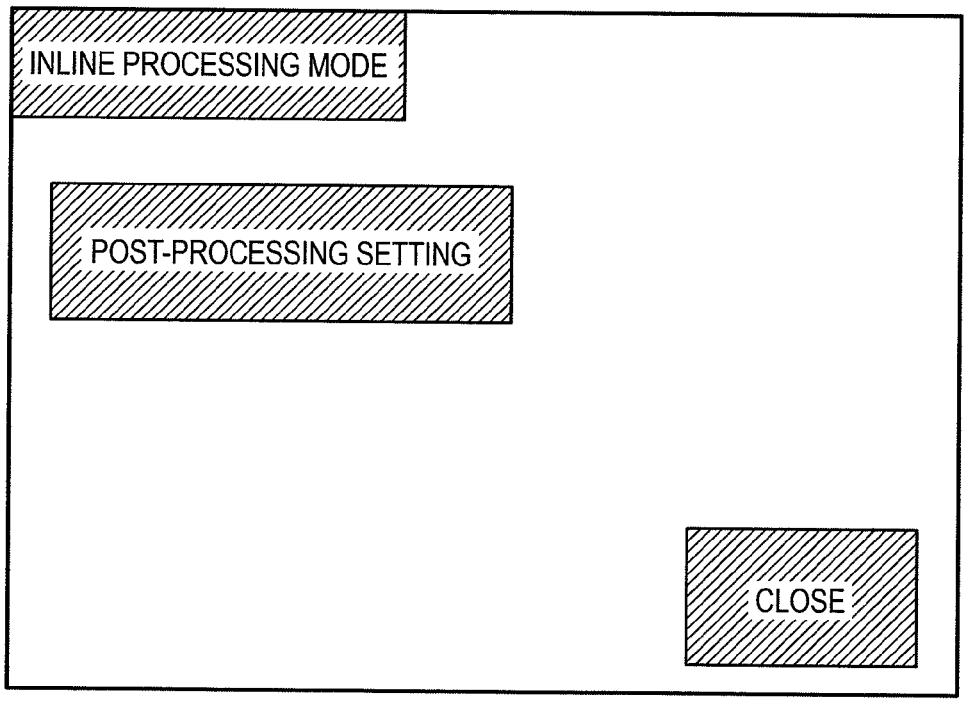
Figure 10A:
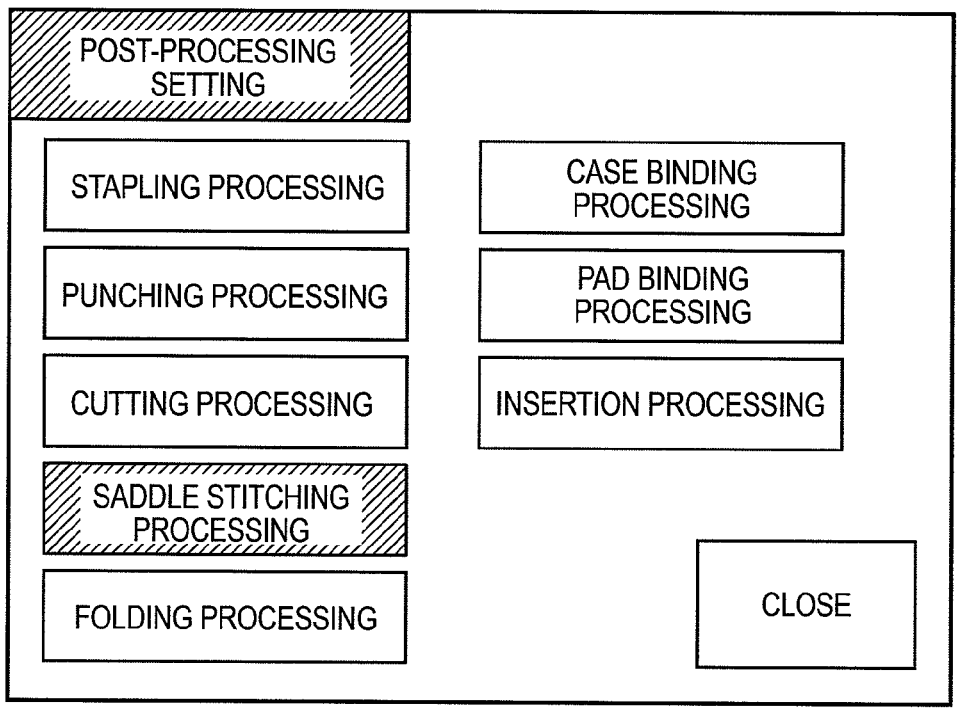
FIGS. 10A and 10B are schematic views each showing a UI.

Inline processing will be explained with reference to the flowchart of FIG. 7. In step S1100, inline processing starts. In step S1101, an inline UI screen (FIG. 9A) is displayed. In step S1102, if the user presses a "finishing (inline)" button on the inline UI screen (FIG. 9A), the display screen switches to an "inline processing mode" UI screen (FIG. 9B: second user interface screen) to accept a post-processing setting (post-processing condition) via the UI screen. The "inline processing mode" UI screen (FIG. 9B) displays the inline processing mode so that the user can identify it. This UI screen has a "post-processing setting" selection button. When the user presses the "post-processing setting" button, the display screen switches to a "post-processing setting" UI screen (FIG. 10A). The "post-processing setting" UI screen (FIG. 10A) displays a plurality of types of post-processes. In the embodiment, assume that saddle stitching processing is performed after copy processing and the user selects "saddle stitching processing" from the "post-processing setting" UI screen (FIG. 10A).

Figure 10B:
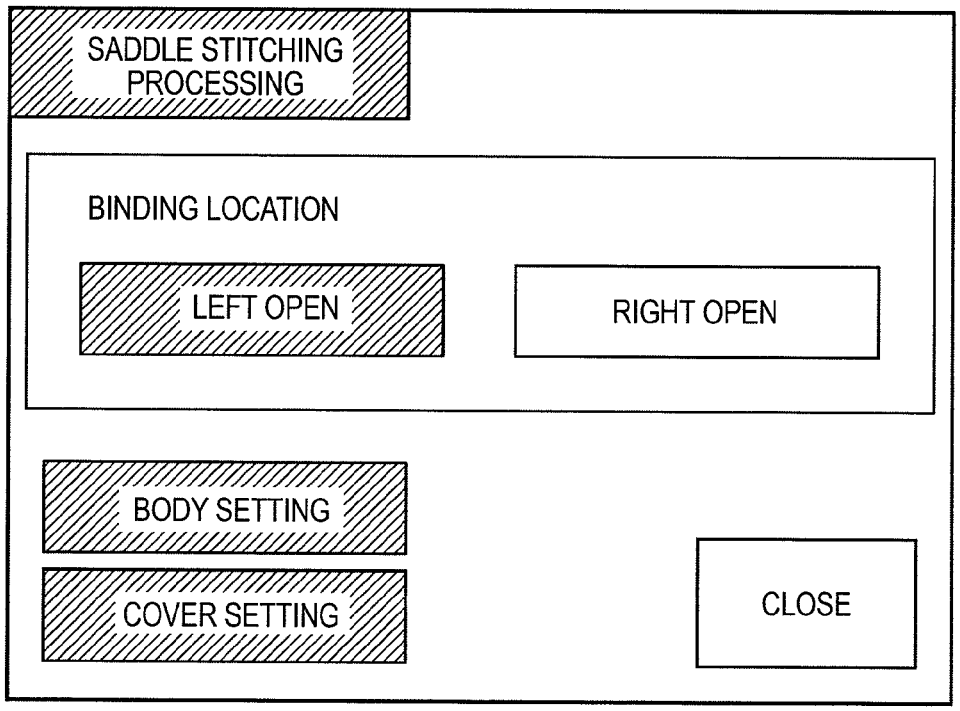

When the user presses the "saddle stitching processing" button, the display screen switches to a "saddle stitching processing" UI screen (FIG. 10B).

Figure 11A:
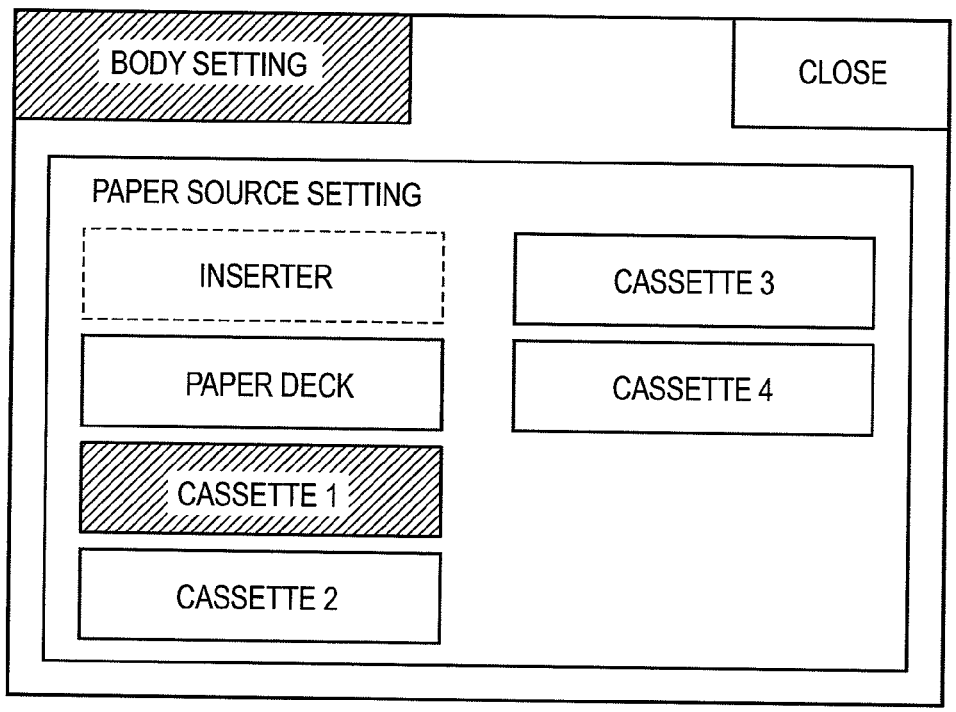
FIGS. 11A and 11B are schematic views each showing a UI.

The "saddle stitching processing" UI screen (FIG. 10B) displays "binding location", "body setting", and "cover setting" setting buttons. First, the user sets "binding location". On this UI screen (FIG. 10B), "left open" or "right open" can be selected. In the embodiment, the user selects "left open" and presses the "left open" button (the selected button is grayed out). When the user selects "body setting" from the "saddle stitching processing" UI screen (FIG. 10B) and presses the "body setting" button, the display screen switches to a "saddle stitching processing (body setting)" UI screen (FIG. 11A). On the "saddle stitching processing (body setting)" UI screen (FIG. 11A), the user sets a paper source (supply source) for feeding printing paper. In the embodiment, "paper deck", "cassette 1", "cassette 2", "cassette 3", or "cassette 4" can be set. In the embodiment, the user selects "cassette 1".

Figure 11B:
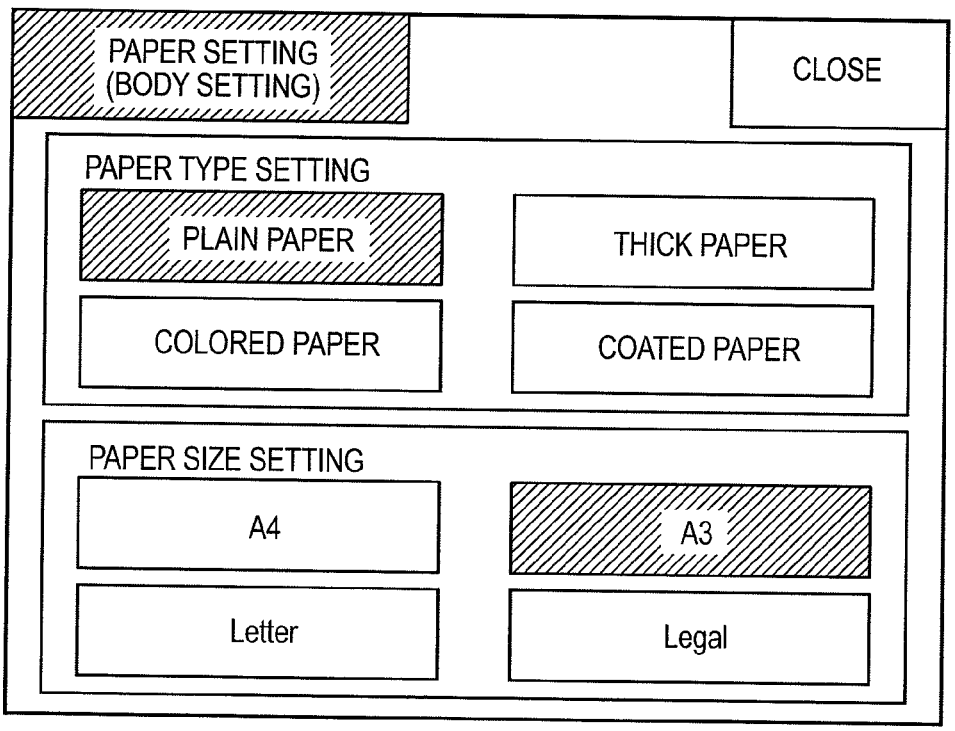
Figure 12A:
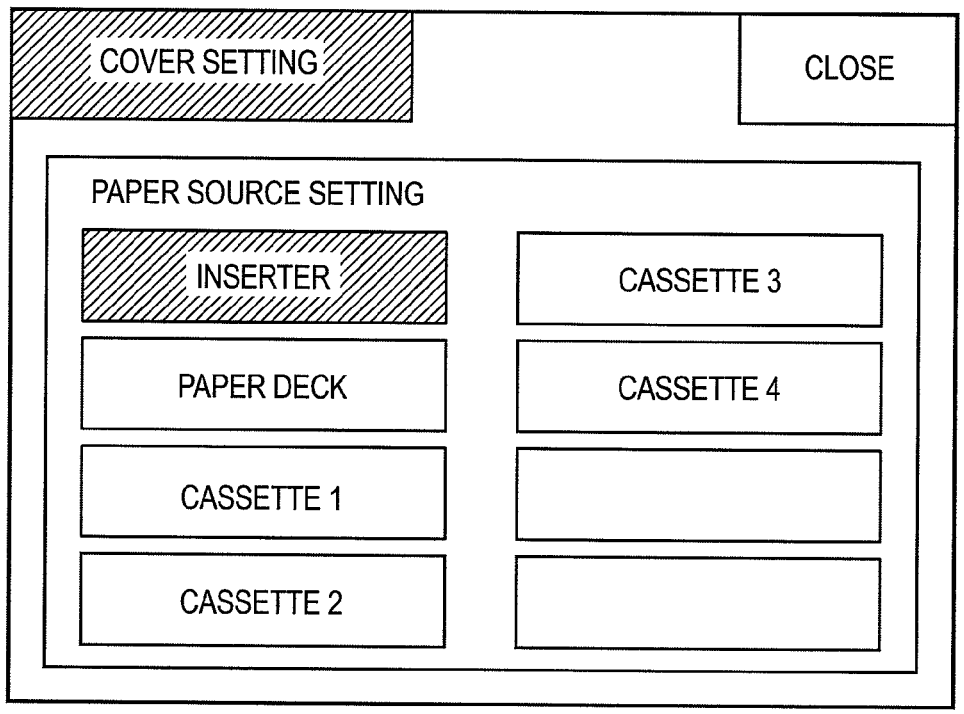
FIGS. 12A and 12B are schematic views each showing a UI.

When the user presses the "cassette 1" button on the "saddle stitching processing (body setting)" UI screen (FIG. 11A), the display screen switches to a "paper setting (body)" UI screen (FIG. 11B). On the paper setting (body)" UI screen (FIG. 11B), the user sets the type and size of paper to be fed. The paper type includes "plain paper" and "thick paper". The paper size includes "A4" and "A3". In the embodiment, the user sets the paper type "plain paper" and the paper size "A3". When the user selects "cover setting" from the "saddle stitching processing" UI screen (FIG. 10B) and presses the "cover setting" button, the display screen switches to a "saddle stitching processing (cover setting)" UI screen (FIG. 12A). On the "saddle stitching processing (cover setting)" UI screen (FIG. 12A), the user sets a paper source for feeding paper to be used as a cover. In the embodiment, "inserter", "paper deck", "cassette 1", "cassette 2", "cassette 3", or "cassette 4" can be set. In the embodiment, the user selects "inserter".

Figure 12B:
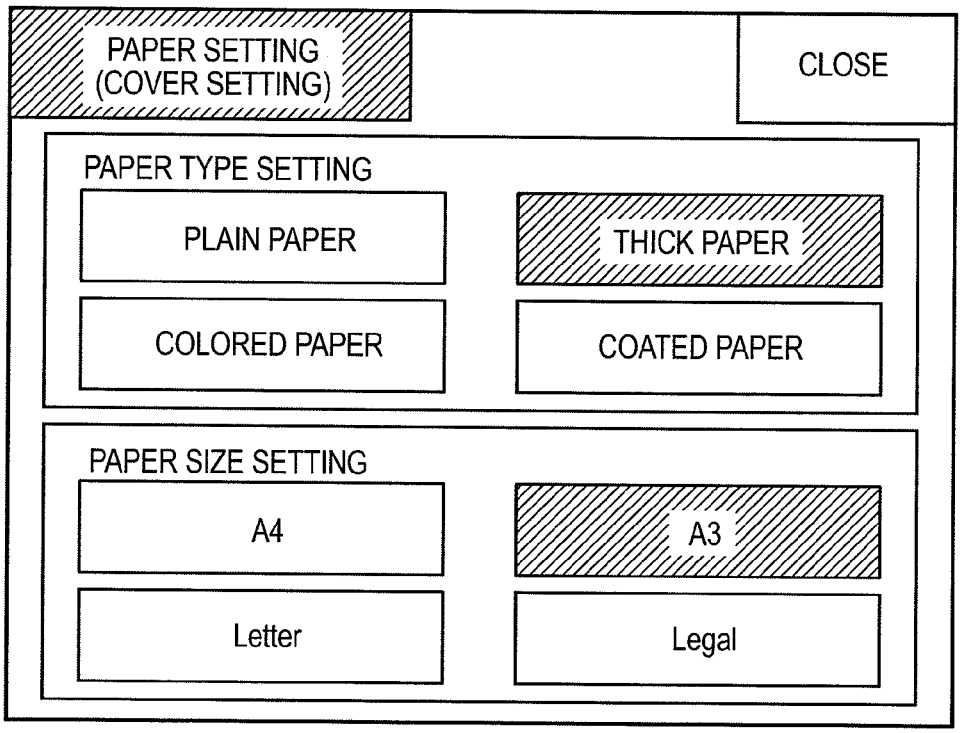

When the user presses the "inserter" button on the "saddle stitching processing (cover setting)" UI screen (FIG. 12A), the display screen switches to a "paper setting (cover)" UI screen (FIG. 12B). On the "paper setting (cover)" UI screen (FIG. 12B), the user sets the type and size of paper to be fed. The paper type includes "plain paper" and "thick paper". The paper size includes "A4" and "A3". In the embodiment, the user sets the paper type "thick paper" and the paper size "A3".

In step S1103, the job set in step S1102 is managed as an inline job. The control unit 205 stores information including creation copy count designation information, sheet count designation information, medium condition designation information, post-processing type designation information, and supply source designation information as management information in a RAM 208. In step S1104, the control unit 205 determines whether it has accepted a job execution instruction. Note that the job execution instruction can be input by pressing a start key 5003. If the control unit 205 has accepted the job execution instruction, the process advances to step S1105; if NO, step S1104 is repeated again. The control unit 205 executes print processing necessary for the job in step S1105, and executes post-processing necessary for the job in step S1106. That is, the control unit 205 executes both print processing by the printing apparatus 100 and post-processing by the post-processing apparatus 200. For this job, while copy sheets are set on an automatic document feeder 330, the printing apparatus 100 executes copy processing and conveys a copied sheet to a saddle stitching apparatus 200-3c. The saddle stitching apparatus 200-3c executes saddle stitching processing for copied sheets and discharges the obtained bound material.

In step S1107, the control unit 205 determines whether the job has ended. If NO in step S1107, the control unit 205 executes steps S1105 and S1106 again. At this time, processing other than saddle stitching may be executed as post-processing in step S1106. If YES in step S1107, the process advances to step S1108. In step S1108, the control unit 205 updates the job management information stored in the RAM 208 using the information set in step S1103. In step S1109, the control unit 205 ends the inline processing.

Figure 8:
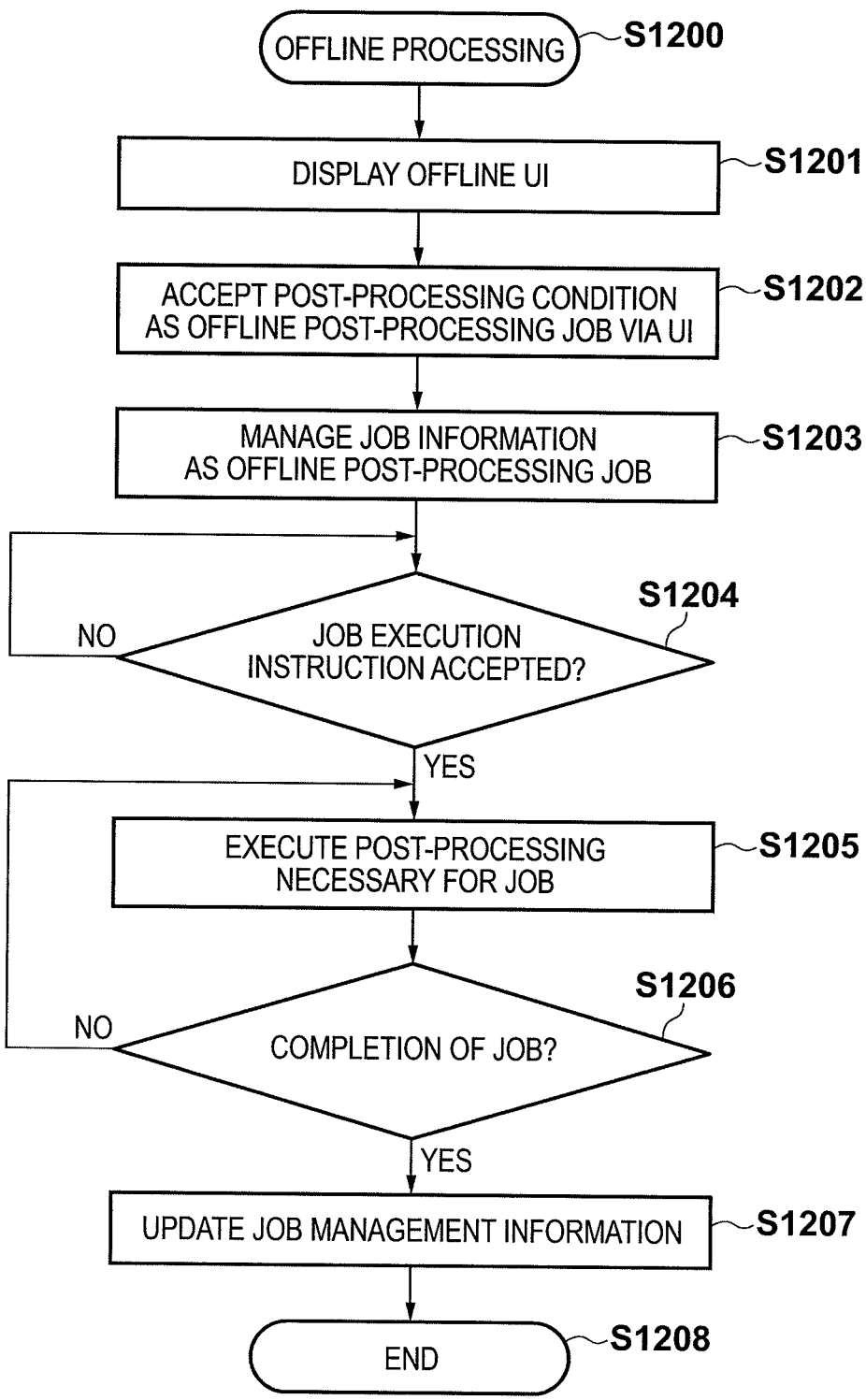
FIG. 8 is a flowchart showing the detailed processing sequence of offline processing (step S1004)

Offline processing will be explained with reference to the flowchart of FIG. 8. Note that the control unit 205 executes steps in the flowchart of FIG. 8. In step S1201, the control unit 205 displays an offline (manual mode) UI screen (FIG. 13A: first user interface screen). In step S1202, the control unit 205 performs "post-processing setting" used offline. The offline UI screen (FIG. 13A) displays a "post-processing setting" button. When the user presses the "post-processing setting" button on the offline UI screen (FIG. 13A), the display screen switches to the "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

Figure 14A:
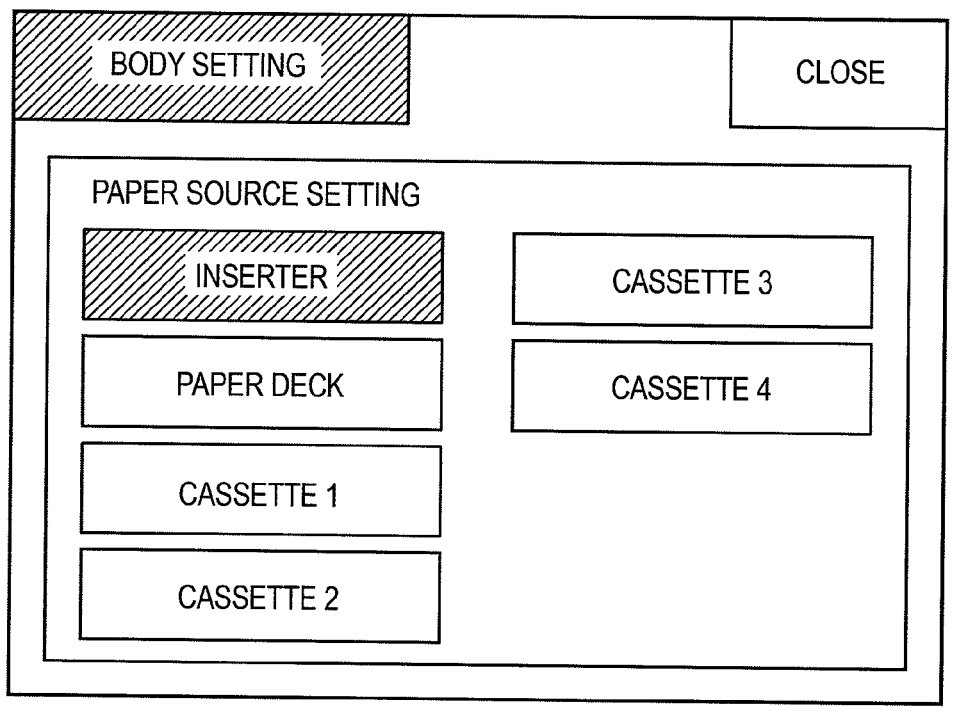
FIGS. 14A and 14B are schematic views each showing a UI.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3".

Figure 14B:
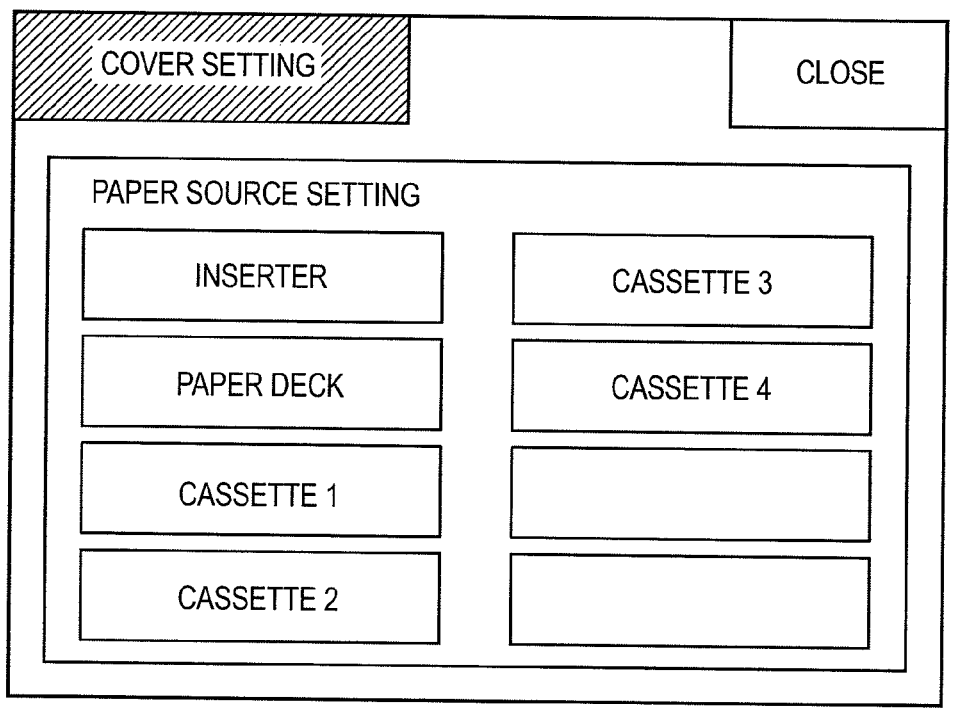

When the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S1203, the control unit 205 manages the job information as offline post-processing job information. The control unit 205 stores this information as management information in the RAM 208. In step S1204, the control unit 205 determines whether it has accepted a job execution instruction. Note that the job execution instruction can be input when the user presses the start key 5003. If the control unit 205 has accepted the job execution instruction, the process advances to step S1205; if NO, step S1204 is repeated again. In step S1205, the control unit 205 executes necessary post-processing as a post-processing job not accompanied by print processing. In the embodiment, (printed) sheets to be used in post-processing are fed from the inserter 200-3d, and undergo post-processing using the saddle stitching apparatus 200-3c. In step S1206, the control unit 205 determines whether post-processing has ended. If NO in step S1206, the control unit 205 executes step S1205 again. In this case, post-processing other than case binding may be done in step S1205.

In step S1207, the control unit 205 updates the job management information stored in the RAM 208 using the information set in step S1204. In step S1208, the offline processing ends.

As described above, a printing system 1000 can execute not only sheet processing accompanied by printing by the printing apparatus 100 but also sheet processing not accompanied by printing by the printing apparatus 100. The user can designate, from a single operation unit 204, both settings of sheet processing accompanied by printing by the printing apparatus 100 and those of sheet processing not accompanied by printing by the printing apparatus 100.

(Second Embodiment)

According to the first embodiment, sheet processing (for example, punching processing or stapling processing) not accompanied by printing by the printing apparatus 100 can be executed. In this case, the user sets, from the operation unit 204, sheet processing to be executed by the post-processing apparatus 200.

The second embodiment will explain control of designating the sheet count when a post-processing apparatus 200 performs sheet processing without printing by a printing apparatus 100 in a printing system 1000. For example, the user may want to create a plurality of copies of a bound material using a saddle stitching apparatus 200-3c. In this case, when setting sheets on the inserter tray of the saddle stitching apparatus 200-3c and executing saddle stitching processing for a plurality of copies of a bound material, the user uses an operation unit 204 to set the sheet count of one (one copy of) book (bound material). A control unit 205 feeds sheets set on the inserter tray of the saddle stitching apparatus 200-3c by the set sheet count, and executes saddle stitching processing.

Processing to be executed in the second embodiment will be explained with reference to the flowchart of FIG. 15. Note that the control unit 205 executes steps in the flowchart of FIG. 15. The second embodiment is another embodiment of the flowchart of FIG. 6 described in the first embodiment, and will be called "offline processing 2".

Figure 18A:
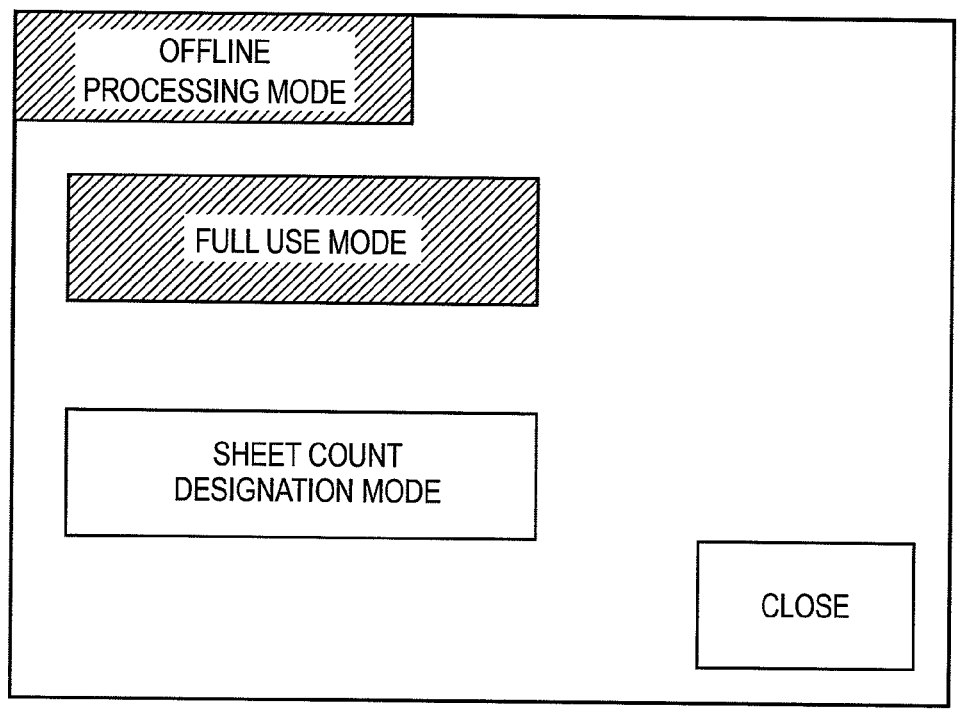
FIGS. 18A and 18B are schematic views each showing a UI.

In step S2500, the process starts. In step S2501, the control unit 205 displays a UI screen (FIG. 18A) for offline processing 2 (manual mode UI). On the "offline processing 2" UI screen (FIG. 18A), "full use mode (first mode)" and "sheet count designation mode (second mode)" selection buttons are prepared. The user selects either the "full use mode" or "sheet count designation mode".

In step S2502, the control unit 205 determines whether the mode selected in step S2501 is the "sheet count designation mode". If the control unit 205 determines in step S2502 that the user has selected the "full use mode" from the offline processing mode UI screen (FIG. 18A) and presses the "full use mode" button, the process advances to step S2503. If the control unit 205 determines in step S2502 that the user has selected the "sheet count designation mode" from the "offline processing mode 2" UI screen (FIG. 18A) and presses the "sheet count designation mode" button, the process advances to step S2504.

In step S2503, the control unit 205 executes the offline processing in the "full use mode". Details of the "full use mode" will be described later with reference to the flowchart of FIG. 16. After the end of processing in the "full use mode", the process advances to step S2505.

In step S2504, the control unit 205 executes the offline processing in the "sheet count designation mode". Details of the "sheet count designation mode" will be described later with reference to the flowchart of FIG. 17. After the end of processing in the "sheet count designation mode", the process advances to step S2505. In step S2505, the process of offline processing 2 ends.

Figure 16:
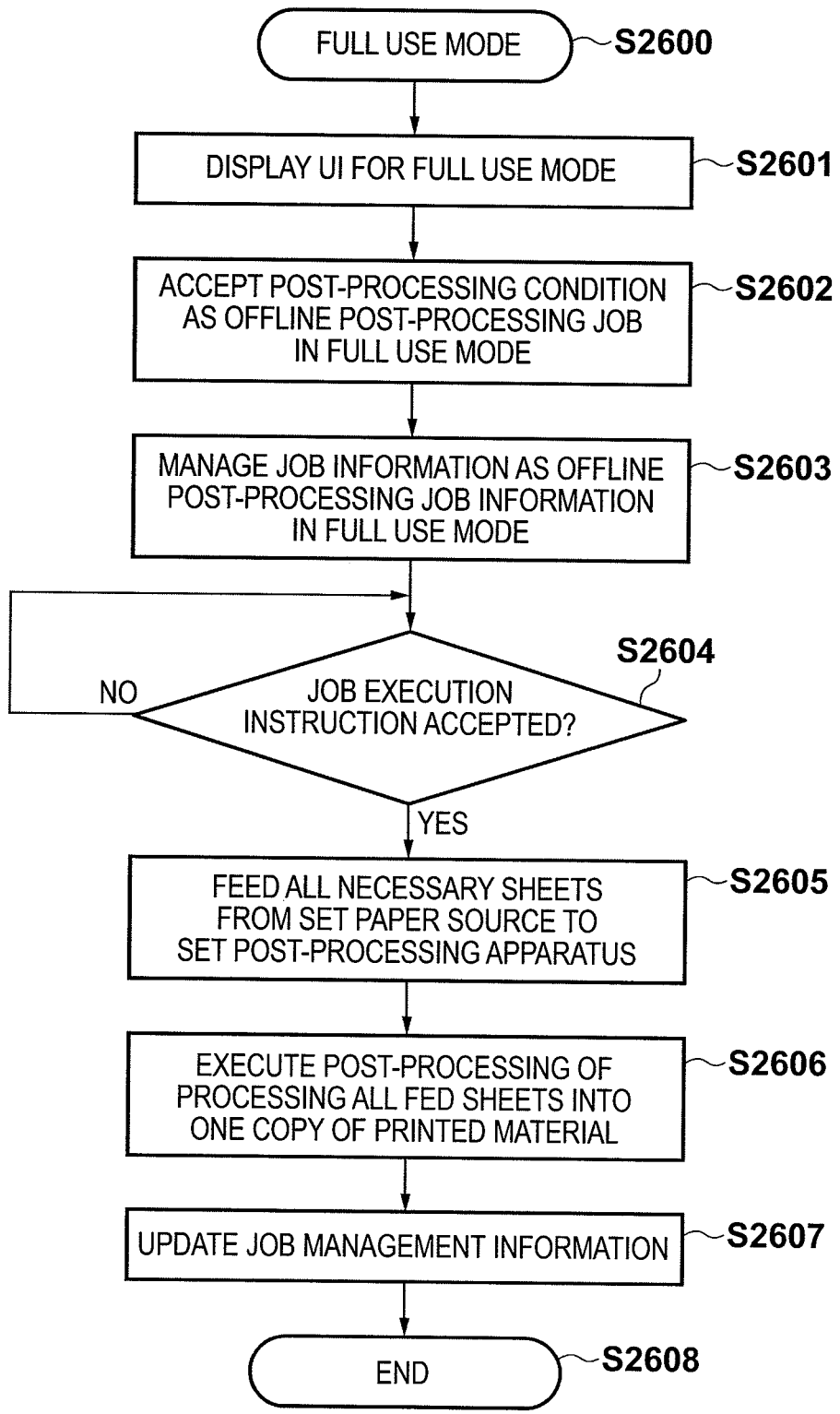
FIG. 16 is a flowchart showing the detailed processing sequence of the full use mode (step S2503)

The "full use mode" will be explained with reference to the flowchart of FIG. 16. Note that the control unit 205 executes steps in the flowchart of FIG. 16. In the full use mode, the supply source provides printed media to the post-processing apparatus 200 until the number of printed media left in the supply source becomes smaller than a predetermined number, and post-processing of processing the provided printed media into one copy of a printed material (output material) is executed.

Figure 18B:
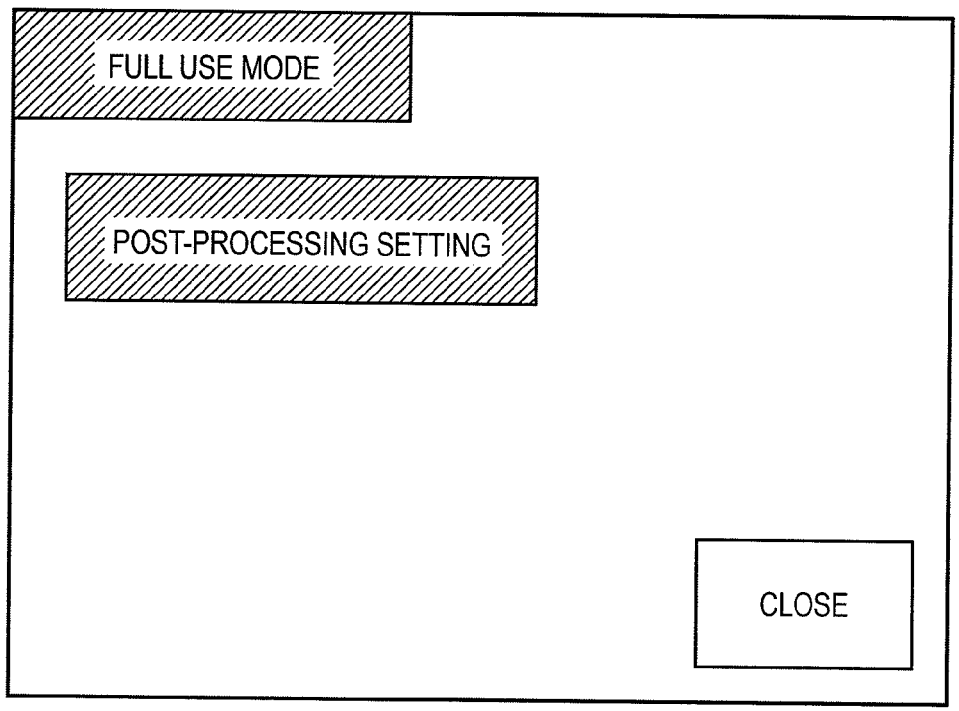

In step S2600, the process of the "full use mode" (first mode) starts. In step S2601, when the user selects the "full use mode" from the "offline processing mode 2" UI screen (FIG. 18A) and presses the "full use mode" button, the display screen switches to a "full use mode" UI screen (FIG. 18B).

In step S2602, the control unit 205 performs "post-processing setting" to be used in the full use mode. The "full use mode" UI screen (FIG. 18B) displays a "post-processing setting" button. When the user presses the "post-processing setting" button on the "full use mode" UI screen (FIG. 18B), the display screen switches to a "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 10B). The "saddle stitching processing" UI screen (FIG. 10B) displays buttons for selecting "body setting" and "cover setting". When the user selects "body setting" from the "saddle stitching processing" UI screen (FIG. 10B) and presses the "body setting" button, the display screen switches to a "saddle stitching processing (body setting)" UI screen (FIG. 11A). On the "saddle stitching processing (body setting)" UI screen (FIG. 11A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 11A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3".

When the user selects "cover setting" from the "saddle stitching processing" UI screen (FIG. 10B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". Hence, offline sheets are fed to the saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the "full use mode" in this process ends.

The "sheet count designation mode" will be explained with reference to the flowchart of FIG. 17. In the sheet count designation mode, the supply source provides printed media to the post-processing apparatus 200 by a sheet count designated by the user, and post-processing of processing the provided printed media into one copy of a printed material (output material) is executed. Note that the control unit 205 executes steps in the flowchart of FIG. 17.

Figure 19A:
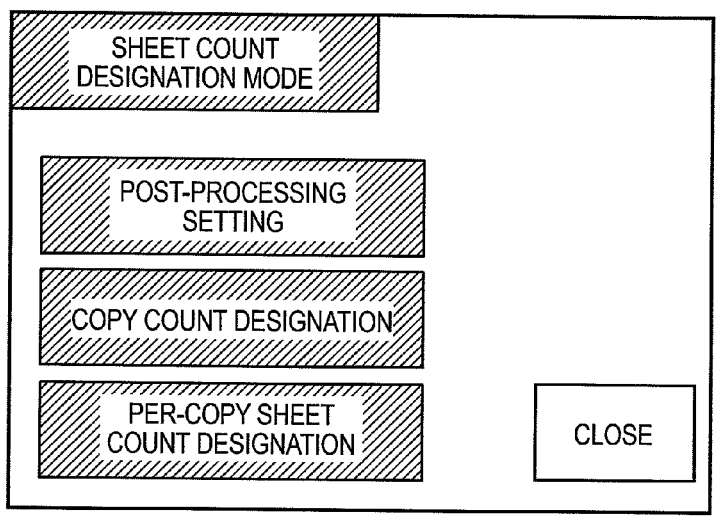
FIGS. 19A to 19C are schematic views each showing a UI.

In step S2700, the process of the "sheet count designation mode" (second mode) starts. In step S2701, when the user selects the "sheet count designation mode" from the "offline processing mode 2" UI screen (FIG. 18A) and presses the "sheet count designation mode" button, the display screen switches to a "sheet count designation mode" UI screen (FIG. 19A).

In step S2702, the control unit 205 performs "post-processing setting" to be used in the sheet count designation mode. The "sheet count designation mode" UI screen (FIG. 19A) displays "post-processing setting", "copy count designation", and "per-copy sheet count designation" buttons. When the user presses the "post-processing setting" button on the "sheet count designation mode" UI screen (FIG. 19A), the display screen switches to the "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". When the user selects "cover setting" from the "saddle stitching processing" UI screen (FIG. 13B) and presses the "cover setting" button, the display screen switches to the "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2703, the creation copy count of a printed material (saddle-stitched material) in offline processing is set. The user selects "copy count designation" from the "sheet count designation mode" UI screen (FIG. 19A) and presses the "copy count designation" button. In response to this, a "copy count designation (sheet count designation mode)" UI screen (FIG. 19B) appears. On the "copy count designation (sheet count designation mode)" UI screen (FIG. 19B), the user sets the creation copy count of a printed material. In the embodiment, the user sets 10 copies.

Figure 19B:
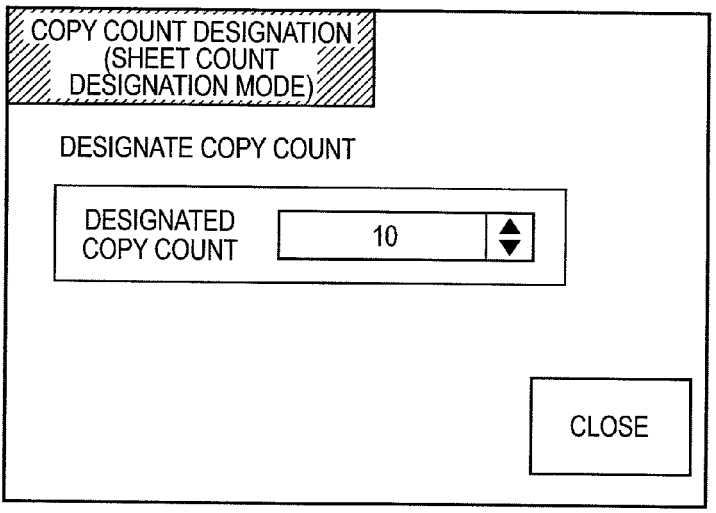
Figure 19C:
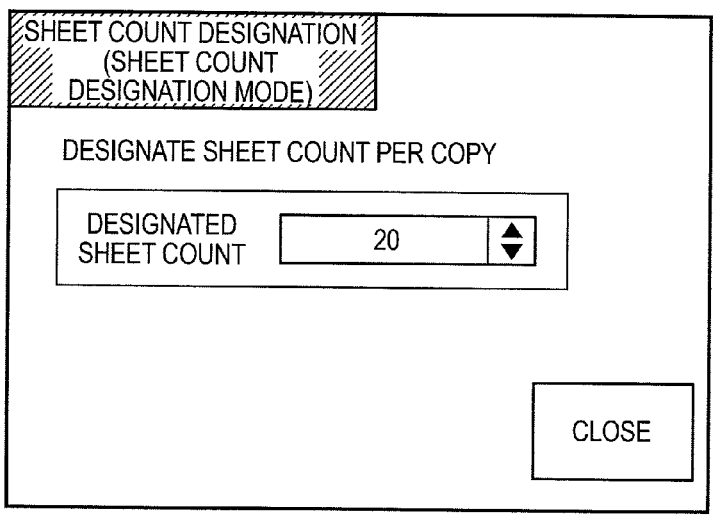

In step S2704, the sheet count of the body of the printed material (saddle-stitched material) in offline processing is set. The user selects "per-copy sheet count designation" from the "sheet count designation mode" UI screen (FIG. 19A) and presses the "per-copy sheet count designation" button. Then, a "sheet count designation (sheet count designation mode)" UI screen (FIG. 19C) appears. The user sets the sheet count per copy of the printed material on the "sheet count designation (sheet count designation mode)" UI screen (FIG. 19C). In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "saddle stitching processing (body setting)" UI screen (FIG. 14A) is "inserter". Thus, the control unit 205 feeds offline processing sheets to the saddle stitching apparatus 200-3c from the "inserter" mounted at the top of the saddle stitching apparatus 200-3c.

In step S2708, the control unit 205 controls the saddle stitching apparatus 200-3c to create a saddle-stitched material using all sheets set on the inserter. In step S2709, the control unit 205 determines whether copies of the printed material have been created by the designated copy count. The control unit 205 stores the creation copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

Figure 20:
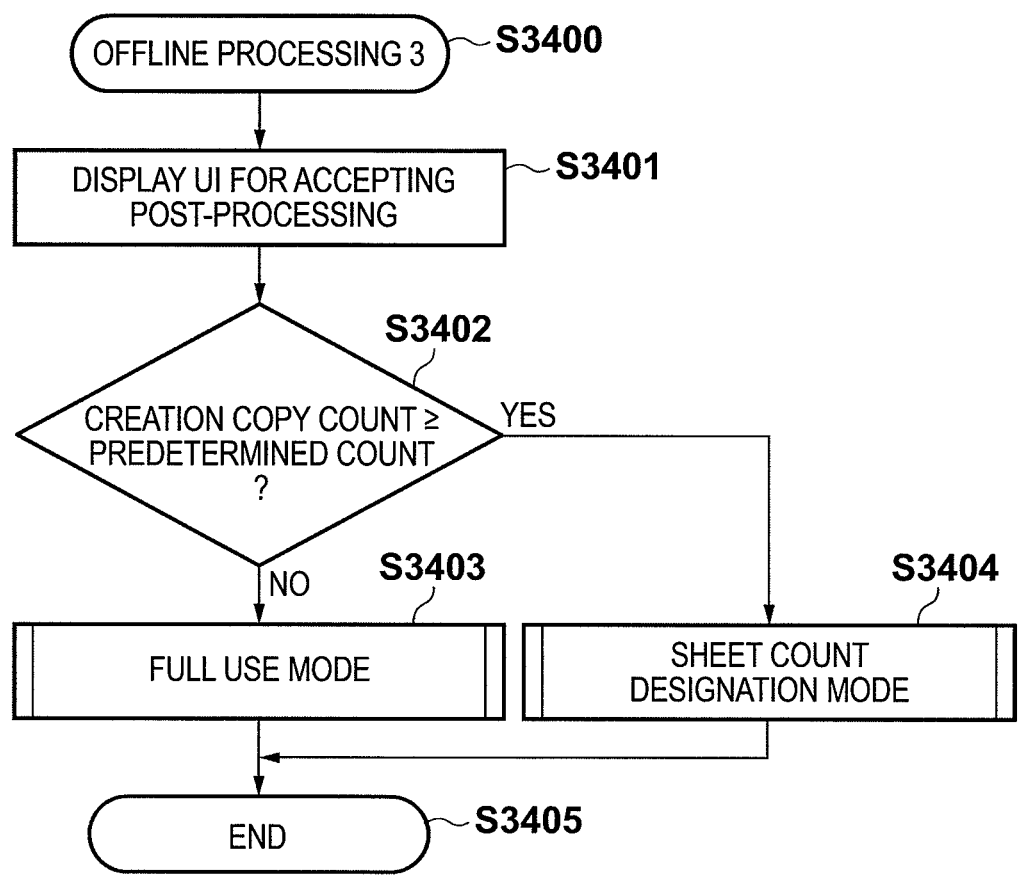
FIG. 20 is a flowchart showing the overall processing sequence of post-processing according to the third embodiment.

(Third Embodiment)
The third embodiment will be described with reference to the flowchart of FIG. 20. Note that a control unit 205 executes steps in the flowchart of FIG. 20. The third embodiment is another embodiment of the flowchart of FIG. 6 described in the first embodiment, and will be called "offline processing 3".

Figure 21A:
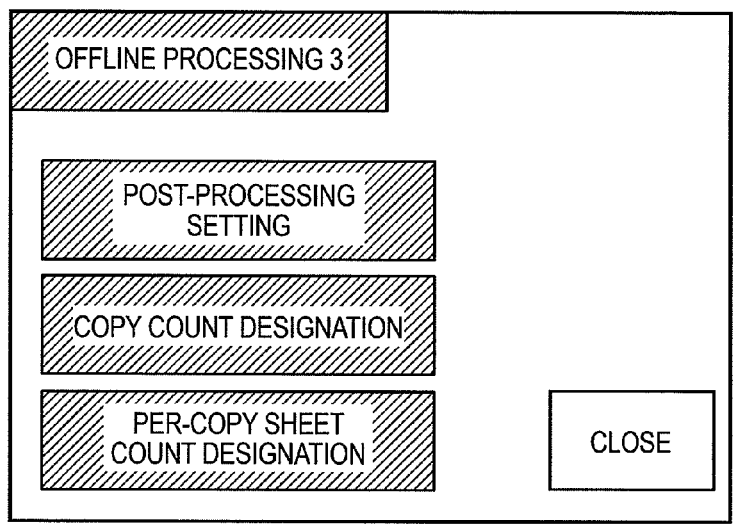
FIGS. 21A to 21C are schematic views each showing a UI.
Figure 21B:
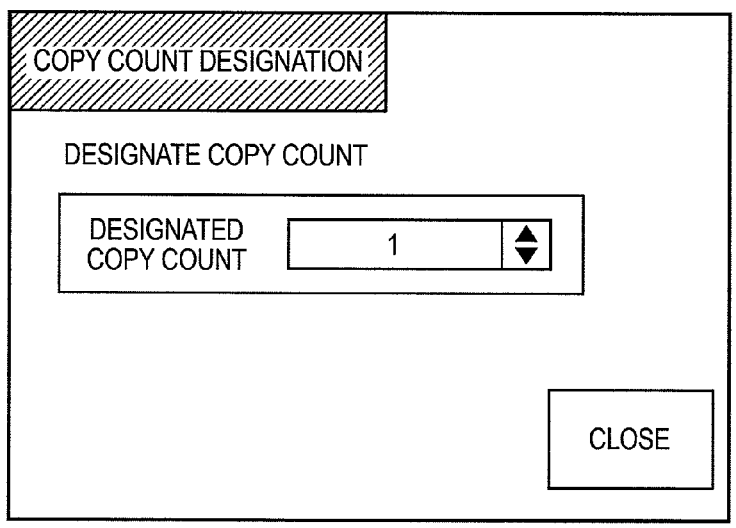

In step S3400, the process starts. In step S3401, the control unit 205 displays a UI screen (FIG. 21A) for offline processing 3 (second type UI for the manual mode). The offline UI screen (FIG. 21A) displays "post-processing setting" and "copy count designation" buttons. When the user presses the "copy count designation" button on the offline UI screen (FIG. 21A), the display screen switches to a "copy count designation" UI screen (FIG. 19B) or (FIG. 21B). On the "copy count designation" UI screen (FIG. 19B), the copy count of a printed material (saddle-stitched material) is set to 10. On the "copy count designation" UI screen (FIG. 21B), the copy count of a printed material (saddle-stitched material) is set to one.

In step S3402, the control unit 205 determines whether the copy count set on the "copy count designation" UI screen (FIG. 19B) or (FIG. 21B) in step S3401 is equal to or larger than a predetermined count (for example, equal to or larger than 2). If YES in step S3402, the process advances to the "sheet count designation mode" in step S3404. For example, when the user sets 10 copies on the "copy count designation" UI screen (FIG. 19B), the process advances to step S3404. Details of the "sheet count designation mode" in step S3404 will be described with reference to the flowchart of FIG. 17. If NO in step S3402, the process advances to the "full use mode" in step S3403. For example, when the copy count is set to one on the "copy count designation" UI screen (FIG. 21B), the process advances to step S3403. Details of the "full use mode" in step S3403 will be described later with reference to the flowchart of FIG. 16. In step S3405, offline processing 3 in this process ends.

The "full use mode" will be explained with reference to the flowchart of FIG. 16. Note that the control unit 205 executes steps in the flowchart of FIG. 16. In step S2600, the process of the "full use mode" starts. In step S2601, the control unit 205 displays the "offline processing mode 3" UI screen (FIG. 21A). In step S2602, the control unit 205 performs "post-processing setting" to be used in the "full use mode". The "offline processing mode 3" UI screen (FIG. 21A) displays "post-processing setting", "copy count designation", and "per-copy sheet count designation" buttons. When the user presses the "post-processing setting" button on the "offline processing mode 3" UI screen (FIG. 21A), the display screen switches to a "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3".

When the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input when the user presses a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline processing sheets to a saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the "full use mode" in this process ends.

The "sheet count designation mode" will be described with reference to the flowchart of FIG. 17. In step S2700, the process of the "sheet count designation mode" starts. Note that the control unit 205 executes steps in the flowchart of FIG. 17. In step S2701, the control unit 205 displays the "offline processing mode 3" UI screen (FIG. 21A). In step S2702, the "offline processing mode 3" UI screen (FIG. 21A) displays "post-processing setting", "copy count designation", and "per-copy sheet count designation" buttons. When the user presses the "post-processing setting" button on the "offline processing mode 3" UI screen (FIG. 21A), the display screen switches to the "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to the "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to the "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to the "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". When the user selects "cover setting" from the "saddle stitching processing" UI screen (FIG. 13B) and presses the "cover setting" button, the display screen switches to the "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2703, the control unit 205 obtains a value indicating the creation copy count of a printed material (saddle-stitched material) in offline processing. Note that the control unit 205 obtains a value which has already been set in step S3401 of the flowchart of FIG. 20.

In step S2704, the sheet count of the body of the printed material (saddle-stitched material) in offline processing is set. The user selects "per-copy sheet count designation" from the "offline processing 3" UI screen (FIG. 21A) and presses the "per-copy sheet count designation" button. Then, a "sheet count designation" UI screen (FIG. 21C) appears. On the "sheet count designation" UI screen (FIG. 21C), the user sets the sheet count per copy. In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "saddle stitching processing (body setting)" UI screen (FIG. 14A) is "inserter". Thus, the control unit 205 feeds offline sheets to the saddle stitching apparatus 200-3c from the "inserter" mounted at the top of the saddle stitching apparatus 200-3c. In step S2708, the control unit 205 controls the saddle stitching apparatus 200-3c to create a saddle-stitched material using all sheets set on the inserter. In step S2709, the control unit 205 determines whether copies of the printed material have been created by the designated copy count. The control unit 205 stores the output copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation processing" in this process ends.

(Fourth Embodiment)

Figure 22:
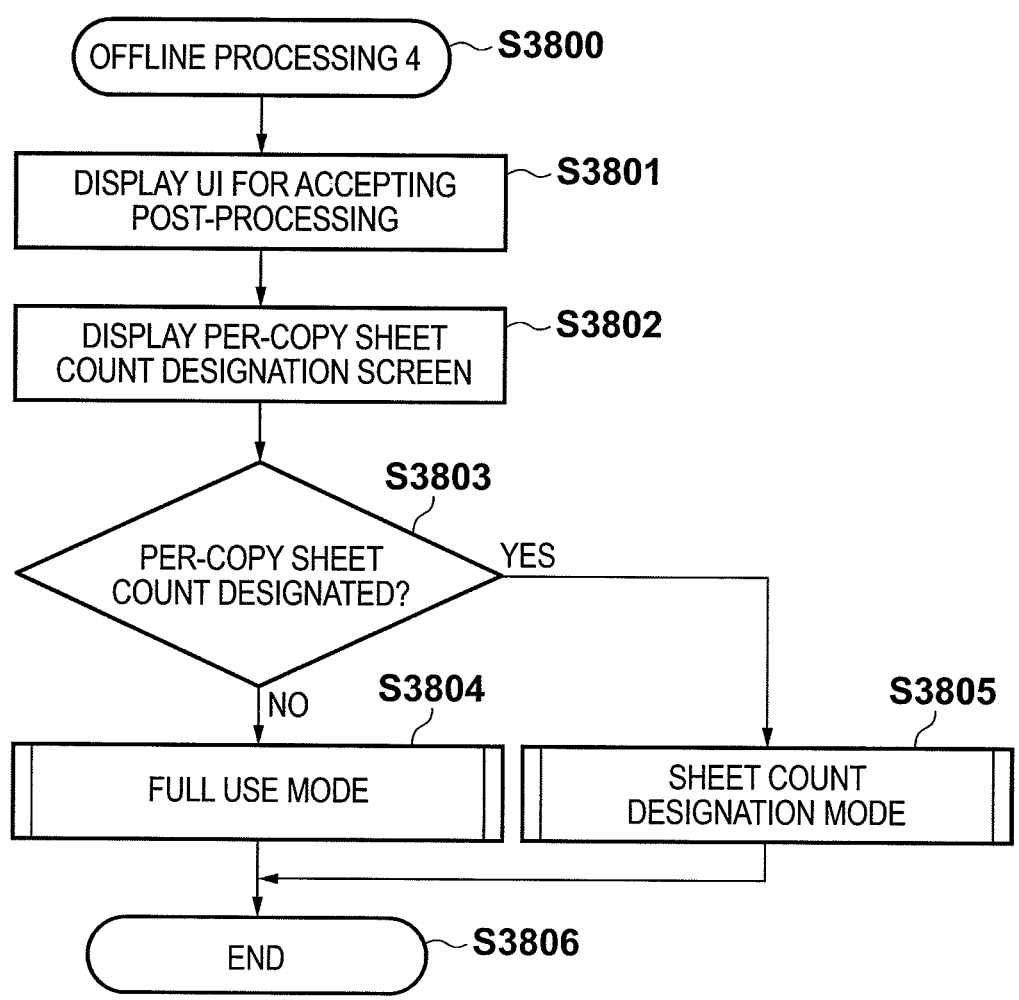
FIG. 22 is a flowchart showing the overall processing sequence of post-processing according to the fourth embodiment.

The fourth embodiment will be described with reference to the flowchart of FIG. 22. Note that a control unit 205 executes steps in the flowchart of FIG. 22. The fourth embodiment is another embodiment of the flowchart of FIG. 6 described in the first embodiment, and will be called "offline processing 4".

In step S3800, the process starts. In step S3801, the control unit 205 displays a UI screen (FIG. 23A) for offline processing 4 (manual mode UI). The "offline processing 4" UI screen (FIG. 23A) displays "post-processing setting", "copy count designation", and "per-copy sheet count designation" buttons. When the user presses the "per-copy sheet count designation" button on the offline UI screen (FIG. 23A), the display screen switches to a "sheet count designation" UI screen (FIG. 23B).

Figure 23A:
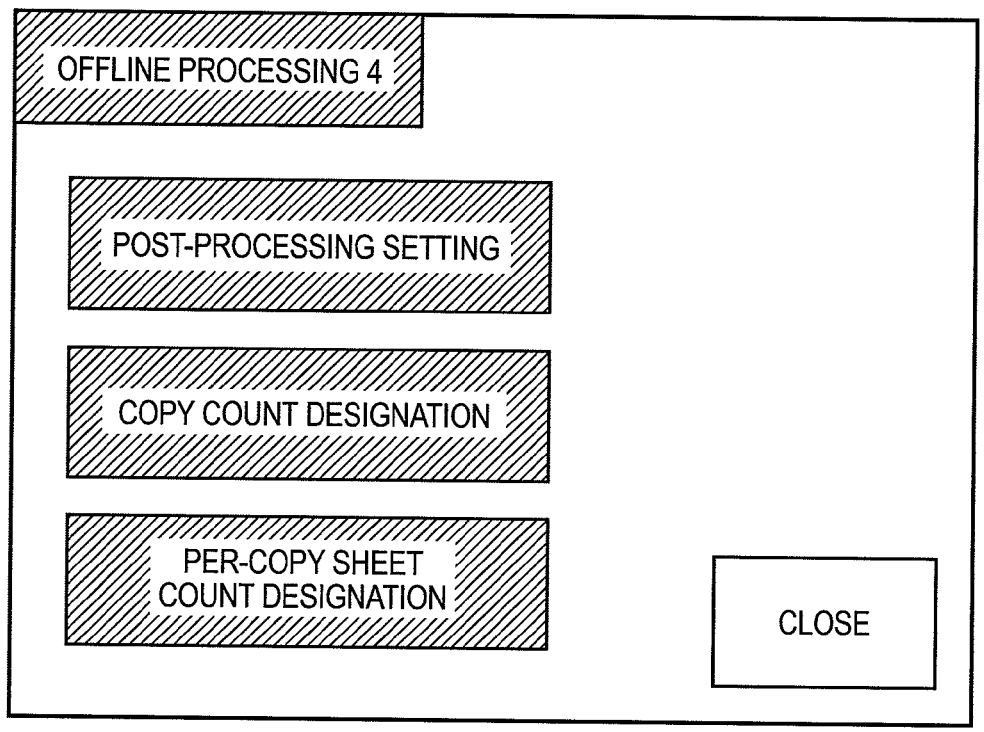
FIGS. 23A and 23B are schematic views each showing a UI.
Figure 23B:
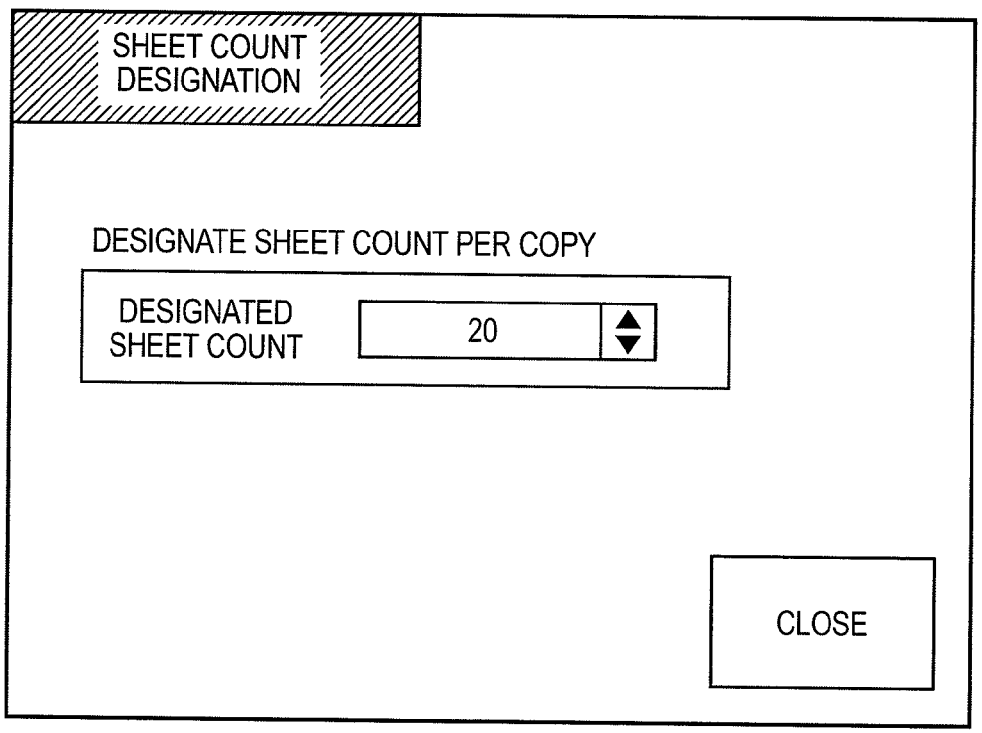

In step S3802, the sheet count per copy of a printed material is designated on the "sheet count designation" UI screen (FIG. 23B). In the embodiment, the user designates 20 sheets. The default value of this setting value is set to 0.

In step S3803, the control unit 205 determines whether the sheet count per copy has actually been designated via the "sheet count designation" UI screen (FIG. 23B) in step S3802. If the sheet count on the "sheet count designation" UI screen (FIG. 23B) is set to 0 (default value), that is, no value is set, the process advances to the "full use mode" in step S3804. Details of the "full use mode" in step S3804 will be described later with reference to the flowchart of FIG. 16. If a sheet count other than 0 (default value) is set on the "sheet count designation" UI screen (FIG. 23B), the process advances to the "sheet count designation mode" in step S3805. Details of the "sheet count designation mode" in step S3805 will be described with reference to the flowchart of FIG. 17. In step S3806, "offline processing 4" in this process ends.

The "full use mode" will be explained with reference to the flowchart of FIG. 16. Note that the control unit 205 executes steps in the flowchart of FIG. 16. In step S2600, the process of the "full use mode" starts. In step S2601, the control unit 205 displays the "offline processing mode 4" UI screen (FIG. 23A).

In step S2602, the control unit 205 performs "post-processing setting" to be used in the full use mode. The "offline processing mode 4" UI screen (FIG. 23A) displays "post-processing setting", "copy count designation", and "per-copy sheet count designation" buttons. When the user presses the "post-processing setting" button on the "offline processing mode 4" UI screen (FIG. 23A), the display screen switches to a "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3".

When the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline sheets to a saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the "full use mode" in this process ends.

The "sheet count designation mode" will be described with reference to the flowchart of FIG. 17. Note that the control unit 205 executes steps in the flowchart of FIG. 17. In step S2700, the process of the "sheet count designation mode" starts. In step S2701, the control unit 205 displays the "offline processing mode 4" UI screen (FIG. 23A).

In step S2702, the "offline processing mode 4" UI screen (FIG. 23A) displays "post-processing setting", "copy count designation", and "per-copy sheet count designation" buttons. When the user presses the "post-processing setting" button on the "offline processing mode 4" UI screen (FIG. 23A), the display screen switches to the "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to the "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to the "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to the "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". When the user selects "cover setting" from the "saddle stitching processing" UI screen (FIG. 13B) and presses the "cover setting" button, the display screen switches to the "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2703, the creation copy count of a printed material (saddle-stitched material) in offline processing 4 is set. The user selects "copy count designation" from the "offline processing 4" UI screen (FIG. 23A) and presses the "copy count designation" button. In response to this, a "copy count designation (sheet count designation mode)" UI screen (FIG. 21B) appears. The user sets the copy count on the "copy count designation (sheet count designation mode)" UI screen (FIG. 21B). In the embodiment, the user sets 10 copies.

In step S2704, the control unit 205 obtains a value indicating the sheet count per copy of the printed material (saddle-stitched material) in "offline processing 4". As this value, the control unit 205 obtains a value which has already been set in step S3802 of the flowchart of FIG. 22.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "saddle stitching processing (body setting)" UI screen (FIG. 14A) is "inserter". Thus, the control unit 205 feeds offline sheets to the saddle stitching apparatus 200-3c from the "inserter" mounted at the top of the saddle stitching apparatus 200-3c.

In step S2708, the control unit 205 controls the saddle stitching apparatus 200-3c to create a saddle-stitched material using all sheets set on the inserter. In step S2709, the control unit 205 checks whether copies of the printed material have been created by the designated copy count. The control unit 205 stores the output copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

(Fifth Embodiment)

Figure 24:
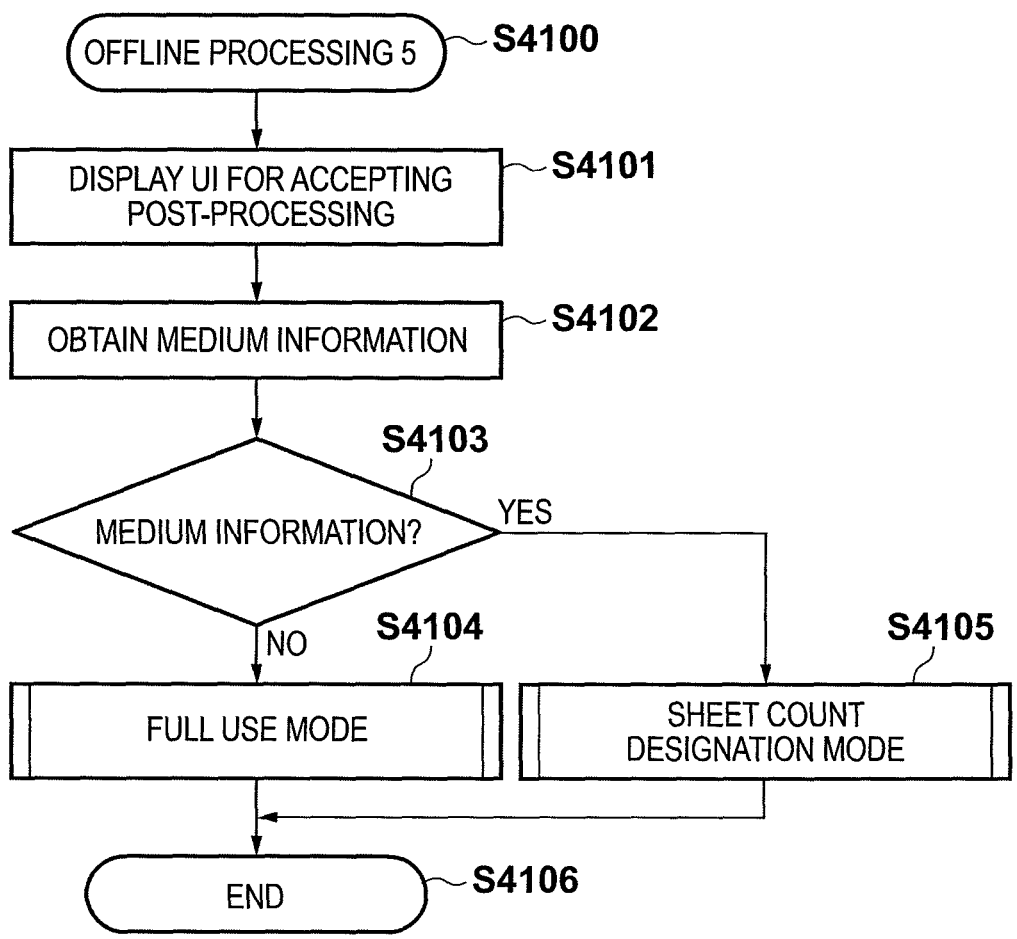
FIG. 24 is a flowchart showing the overall processing sequence of post-processing according to the fifth embodiment.

The fifth embodiment will be described with reference to the flowchart of FIG. 24. Note that a control unit 205 executes steps in the flowchart of FIG. 24. The fifth embodiment is another embodiment of the flowchart of FIG. 6 described in the first embodiment, and will be called "offline processing 5". In step S4100, the process starts.

In step S4101, the control unit 205 displays a UI screen (FIG. 25A) for offline processing 5 (manual mode UI). The "offline processing 5" UI screen (FIG. 25A) displays "post-processing setting", "copy count designation", "per-copy sheet count designation", and "paper setting" buttons. When the user presses the "paper setting" button on the offline UI screen (FIG. 25A), the display screen switches to a "paper setting (paper feed)" UI screen (FIG. 25B).

Figure 25A:
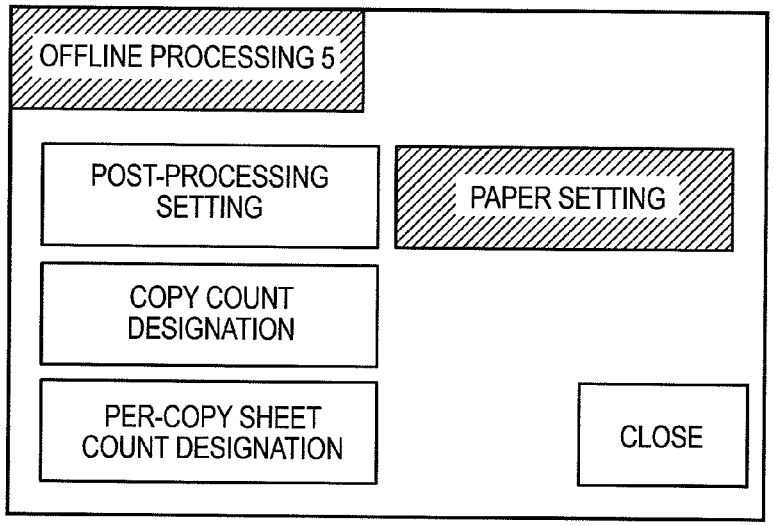
FIGS. 25A to 25C are schematic views each showing a UI.
Figure 25B:
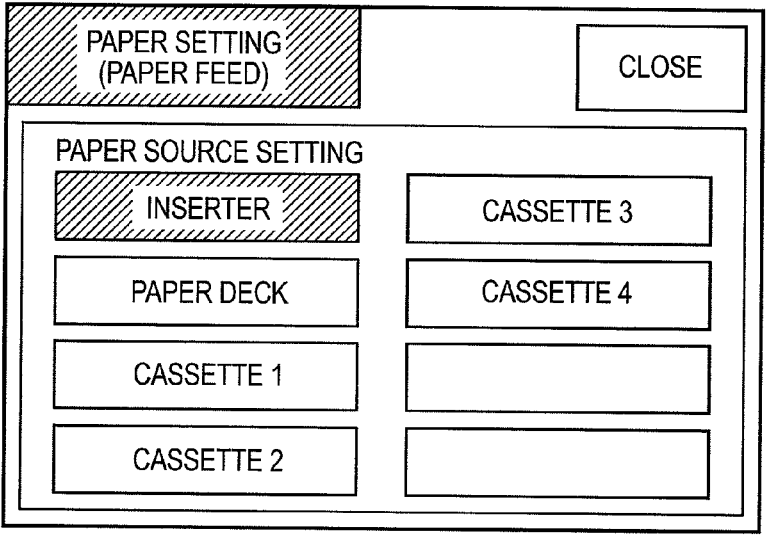

In step S4102, paper information used in "offline processing 5" is set on the "paper setting (paper feed)" UI screen (FIG. 25B). On the "paper setting (paper feed)" UI screen (FIG. 25B), the user sets a paper source for feeding offline printing paper. In the embodiment, "inserter", "paper deck", "cassette 1", "cassette 2", "cassette 3", or "cassette 4" can be set. In the embodiment, the user selects "inserter".

Figure 25C:
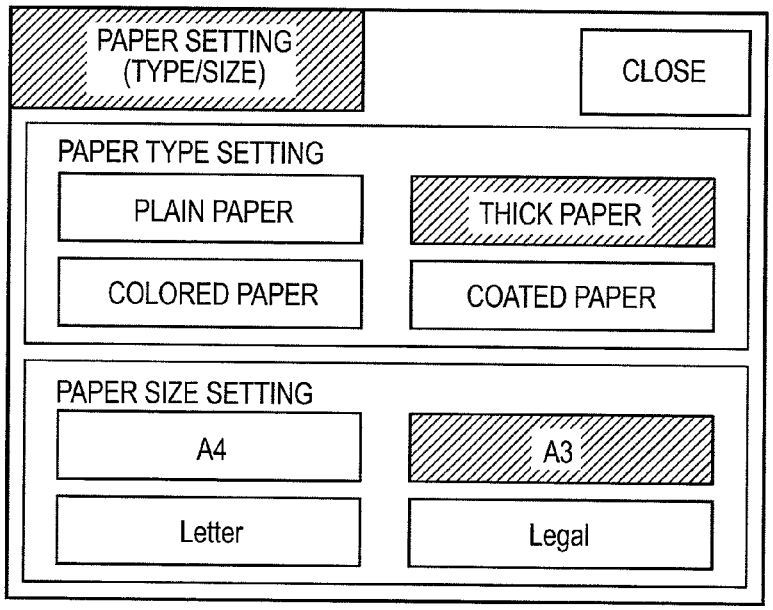

When the user presses the "inserter" button on the "paper setting (paper feed)" UI screen (FIG. 25B), the display screen switches to a "paper setting (type/size)" UI screen (FIG. 25C). On the "paper setting (type/size)" UI screen (FIG. 25C), the user sets the type and size of paper to be fed in offline printing. The paper type includes "plain paper" and "thick paper". The paper size includes "A4" and "A3". In the embodiment, the user sets the paper type "plain paper" and the paper size "A3".

In step S4103, the control unit 205 checks whether paper information has been set on the "paper setting" UI screen (FIG. 25A) in step S4102. At this condition setting, the "full use mode" and "sheet count designation mode" are switched based on the presence/absence of medium information. This is because no post-processing can be done for some media. If no paper information has been set on the "paper setting" UI screen (FIG. 25A), the process advances to the "full use mode" in step S4104. Details of the "full use mode" in step S4104 will be described later with reference to the flowchart of FIG. 16. If paper information has been set on the "paper setting" UI screen (FIG. 25A), the process advances to the "sheet count designation mode" in step S4105. Details of the "sheet count designation mode" in step S4105 will be described with reference to the flowchart of FIG. 17. In step S4106, "offline processing 5" in this process ends.

The "full use mode" will be explained with reference to the flowchart of FIG. 16. Note that the control unit 205 executes steps in the flowchart of FIG. 16. In step S2600, the process of the "full use mode" (first mode) starts. In step S2601, the control unit 205 displays the "offline processing mode 5" UI screen (FIG. 25A).

In step S2602, the "offline processing mode 5" UI screen (FIG. 25A) displays "post-processing setting", "copy count designation", and "per-copy sheet count designation" buttons. When the user presses the "post-processing setting" button on the "offline processing mode 5" UI screen (FIG. 25A), the display screen switches to a "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". After that, when the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline sheets to a saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the "full use mode" in this process ends.

The "sheet count designation mode" will be described with reference to the flowchart of FIG. 17. Note that the control unit 205 executes steps in the flowchart of FIG. 17. In step S2700, the process of the "sheet count designation mode" starts. In step S2701, the control unit 205 displays the "offline processing mode 5" UI screen (FIG. 25A).

In step S2702, the "offline processing mode 5" UI screen (FIG. 25A) displays "post-processing setting", "copy count designation", "per-copy sheet count designation", and "paper setting" buttons. When the user presses the "post-processing setting" button on the "offline processing mode 5" UI screen (FIG. 25A), the display screen switches to the "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to the "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to the "saddle stitching processing (body setting)" UI screen (FIG. 14A). On the "saddle stitching processing (body setting)" UI screen (FIG. 14A), the user sets a paper source for feeding offline printing paper. In the embodiment, paper information has already been set because paper information has already been set in step S4102 of the flowchart of FIG. 24.

In step S2703, the creation copy count of a printed material (saddle-stitched material) in offline processing is set. The user selects "copy count designation" from the "offline processing mode 5" UI screen (FIG. 25A) and presses the "copy count designation" button. In response to this, a "copy count designation (sheet count designation mode)" UI screen (FIG. 21B) appears. The user sets the copy count on the "copy count designation (sheet count designation mode)" UI screen (FIG. 21B). In the embodiment, the user sets 10 copies.

In step S2704, the sheet count of the body of the printed material (saddle-stitched material) in offline processing is set. The user selects "per-copy sheet count designation" from the "offline processing 5" UI screen (FIG. 25A) and presses the "per-copy sheet count designation" button. Then, a "sheet count designation" UI screen (FIG. 23B) appears. The user sets the sheet count per copy on the "sheet count designation" UI screen (FIG. 23B). In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "paper setting (paper feed)" UI screen (FIG. 25B) is "inserter". Hence, the control unit 205 feeds offline sheets to the saddle stitching apparatus 200-3c from the "inserter" mounted at the top of the saddle stitching apparatus 200-3c in FIG. 4B.

In step S2708, the control unit 205 controls the saddle stitching apparatus 200-3c to create a saddle-stitched material using all sheets set on the inserter. In step S2709, the control unit 205 checks whether copies of the printed material have been created by the designated copy count. The control unit 205 stores the output copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

(Sixth Embodiment)

Figure 26:
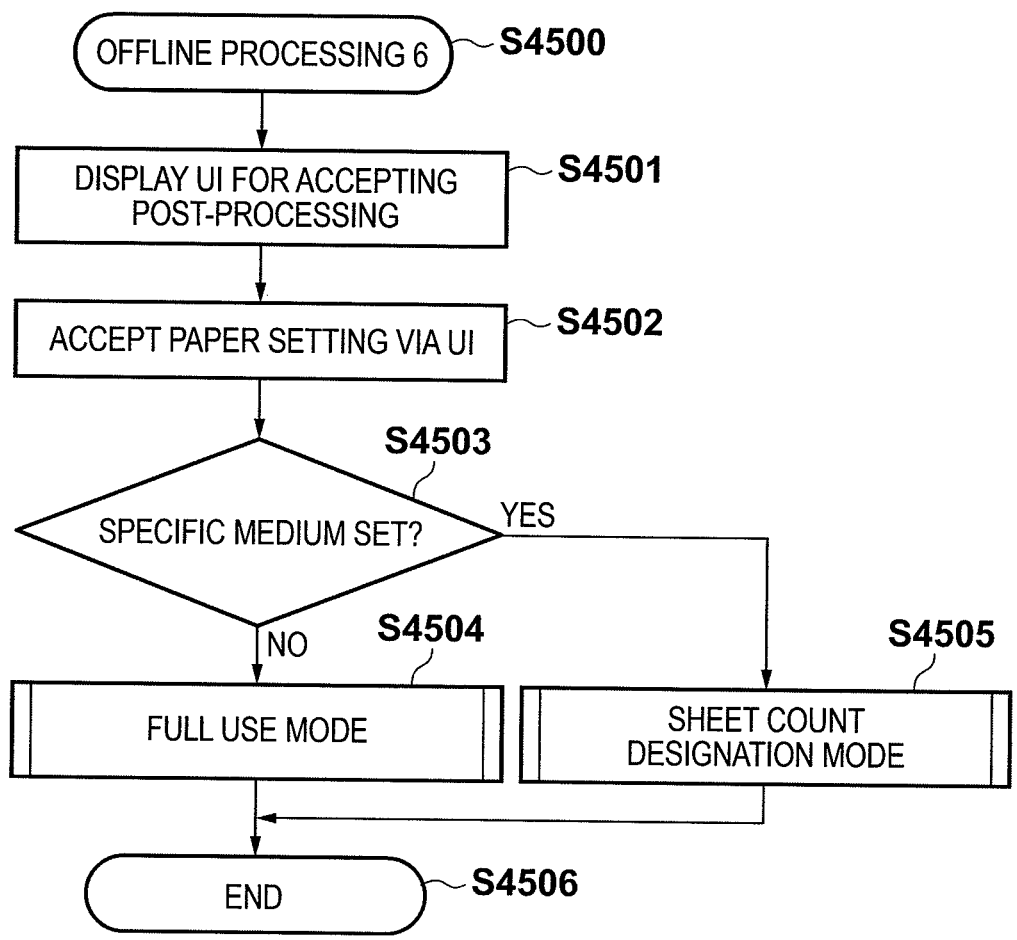
FIG. 26 is a flowchart showing the overall processing sequence of post-processing according to the sixth embodiment.

The sixth embodiment will be described with reference to the flowchart of FIG. 26. Note that a control unit 205 executes steps in the flowchart of FIG. 26. The sixth embodiment is another embodiment of the flowchart of FIG. 6 described in the first embodiment, and will be called "offline processing 6".

In step S4500, the process starts. In step S4501, the control unit 205 displays a UI screen (FIG. 27) for offline processing 6 (manual mode UI). The "offline processing 6" UI screen (FIG. 27) displays "post-processing setting", "copy count designation", "per-copy sheet count designation", and "paper setting" buttons. When the user presses the "paper setting" button on the offline UI screen (FIG. 27), the display screen switches to a "paper setting (paper feed)" UI screen (FIG. 25B).

In step S4502, paper information used in "offline processing 6" is set on the "paper setting (paper feed)" UI screen (FIG. 25B). On the "paper setting (paper feed)" UI screen (FIG. 25B), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "paper setting (paper feed)" UI screen (FIG. 25B), the display screen switches to a "paper setting (type/size)" UI screen (FIG. 25C). On the "paper setting (type/size)" UI screen (FIG. 25C), the user sets the type and size of paper to be fed in offline printing. The paper type includes "plain paper" and "thick paper". The paper size includes "A4" and "A3". In the embodiment, the user sets the paper type "plain paper" and the paper size "A3".

In step S4503, the control unit 205 determines, based on the paper setting accepted via the "paper setting" UI screen (FIG. 25B), whether a specific medium free from any limitation on post-processing has been set. This is because post-processing is sometimes limited depending on the type of medium. If paper information (unspecified medium) not determined in advance has been set on the "paper setting" UI screen (FIG. 25C), the process advances to the "full use mode" in step S4504. Details of the "full use mode" in step S4504 will be described later with reference to the flowchart of FIG. 16. If paper information (specific medium) has been set on the "paper setting" UI screen (FIG. 25C), the process advances to the "sheet count designation mode" in step S4505. Details of the "sheet count designation mode" in step S4505 will be described with reference to the flowchart of FIG. 17. In step S4506, "offline processing 6" in this process ends.

The "full use mode" will be explained with reference to the flowchart of FIG. 16. Note that the control unit 205 executes steps in the flowchart of FIG. 16. In step S2600, the process of the "full use mode" (first mode) starts. In step S2601, the control unit 205 displays the "offline processing mode 6" UI screen (FIG. 27).

In step S2602, the "offline processing mode 6" UI screen (FIG. 27) displays a "post-processing setting" button. When the user presses the "post-processing setting" button on the "offline processing mode 6" UI screen (FIG. 27), the display screen switches to a "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". Then, when the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline sheets to a saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the full use mode in this process ends.

The sheet count designation mode will be described with reference to the flowchart of FIG. 17. Note that the control unit 205 executes steps in the flowchart of FIG. 17. In step S2700, the process of the "sheet count designation mode 6" starts. In step S2701, the control unit 205 displays the "offline processing mode 6" UI screen (FIG. 27).

In step S2702, the "offline processing mode 6" UI screen (FIG. 27) displays "post-processing setting", "copy count designation", "per-copy sheet count designation", and "paper setting" buttons. When the user presses the "post-processing setting" button on the "offline processing mode 6" UI screen (FIG. 27), the display screen switches to the "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to the "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to the "saddle stitching processing (body setting)" UI screen (FIG. 14A). On the "saddle stitching processing (body setting)" UI screen (FIG. 14A), the user sets a paper source for feeding offline printing paper. In the embodiment, paper information has already been set because paper information has already been set in step S4102 of the flowchart of FIG. 24.

In step S2703, the creation copy count of a printed material (saddle-stitched material) in offline processing is set. The user selects "copy count designation" from the "offline processing mode 6" UI screen (FIG. 27) and presses the "copy count designation" button. In response to this, a "copy count designation (sheet count designation mode)" UI screen (FIG. 21B) appears. The user sets the copy count on the "copy count designation (sheet count designation mode)" UI screen (FIG. 21B). In the embodiment, the user sets 10 copies.

Figure 21C:
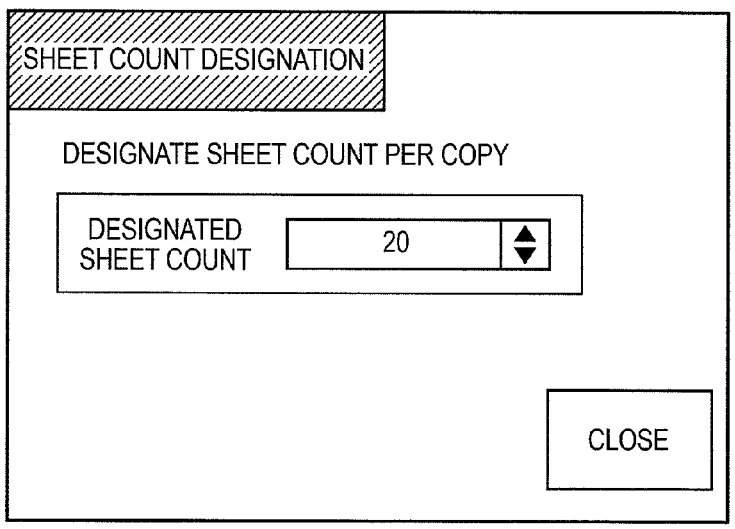

In step S2704, the sheet count of the body of the printed material (saddle-stitched material) in offline processing is set. The user selects "per-copy sheet count designation" from the "offline processing 6" UI screen (FIG. 27) and presses the "per-copy sheet count designation" button. Then, a "sheet count designation (sheet count designation mode)" UI screen (FIG. 21C) appears. The user sets the sheet count per copy on the "sheet count designation (sheet count designation mode)" UI screen (FIG. 21C). In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "paper setting (paper feed)" UI screen (FIG. 25B) is "inserter". Hence, the control unit 205 feeds offline sheets to the saddle stitching apparatus 200-3c from the "inserter" mounted at the top of the saddle stitching apparatus 200-3c.

In step S2708, the control unit 205 controls the saddle stitching apparatus 200-3c to create a saddle-stitched material using all sheets set on the inserter. In step S2709, the control unit 205 checks whether copies of the printed material have been created by the designated copy count. The control unit 205 stores the output copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

(Seventh Embodiment)

Figure 28:
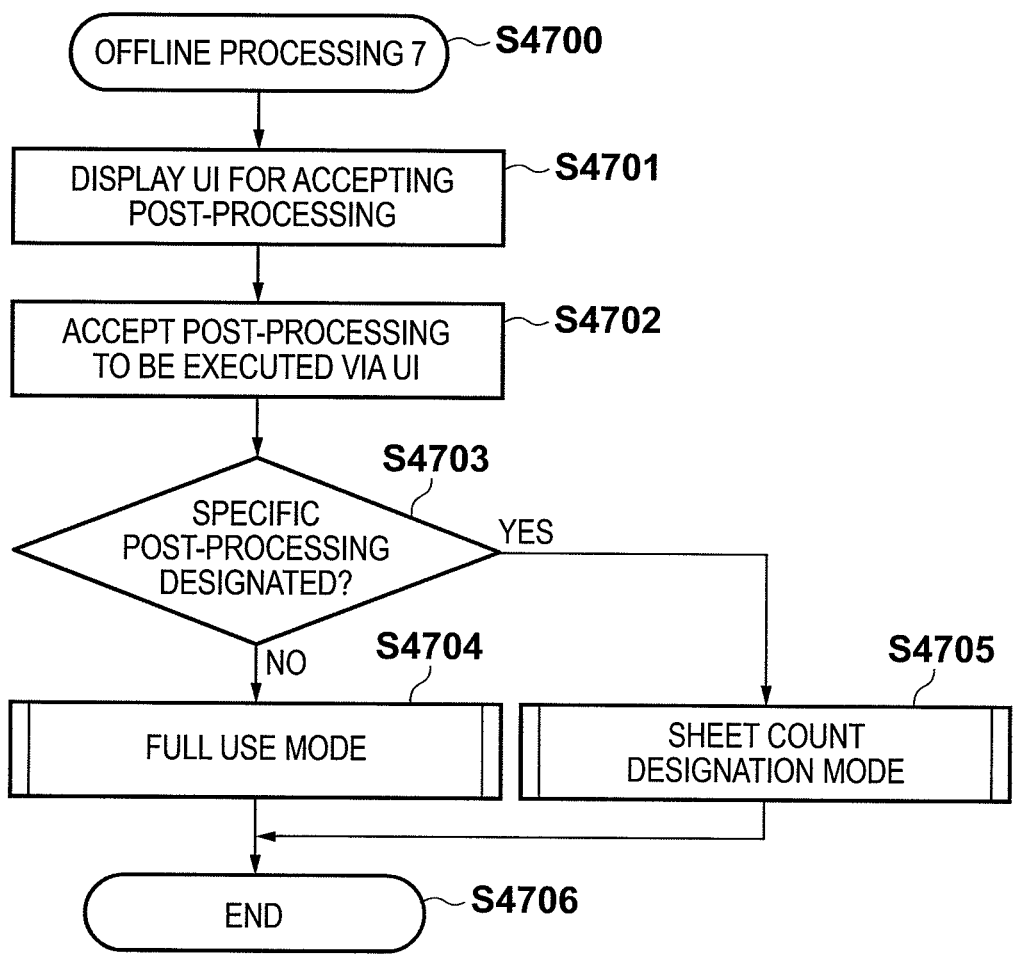
FIG. 28 is a flowchart showing the overall processing sequence of post-processing according to the seventh embodiment.

The seventh embodiment will be described with reference to the flowchart of FIG. 28. Note that a control unit 205 executes steps in the flowchart of FIG. 28. The seventh embodiment is another embodiment of the flowchart of FIG. 6 described in the first embodiment, and will be called "offline processing 7".

In step S4700, the process starts. In step S4701, the control unit 205 displays a UI screen (FIG. 29) for offline processing 7 (manual mode UI). The "offline processing 7" UI screen (FIG. 29) displays "post-processing setting", "copy count designation", and "per-copy sheet count designation" buttons.

In step S4702, when the user presses the "post-processing setting" button on the offline UI screen (FIG. 29), the display screen switches to a "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". Then, when the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S4703, the control unit 205 determines whether the type of post-processing accepted via the "post-processing setting" UI screen (FIG. 10A) in step S4702 is a specific type (first type). In this case, "offline processing" is set to the "full use mode" or "sheet count designation mode" depending on the type of post-processing. That is, the "full use mode" or "sheet count designation mode" can be determined uniquely based on the structural restriction of a post-processing apparatus 200 or the like.

If post-processing of a type (second type) not determined in advance has been designated on the "post-processing setting" UI screen (FIG. 10A), the process advances to the "full use mode" in step S4704. The second type of post-processing is, for example, post-processing in which the allowable sheet count of post-processing per copy of a printed material is small. Details of the "full use mode" in step S4704 will be described later with reference to the flowchart of FIG. 16. If specific post-processing has been set on the "post-processing setting" UI screen (FIG. 10A), the process advances to the "sheet count designation mode" in step S4705. Details of the "sheet count designation mode" in step S4705 will be described with reference to the flowchart of FIG. 17. In step S4706, offline processing 7 in this process ends.

Figure 29:
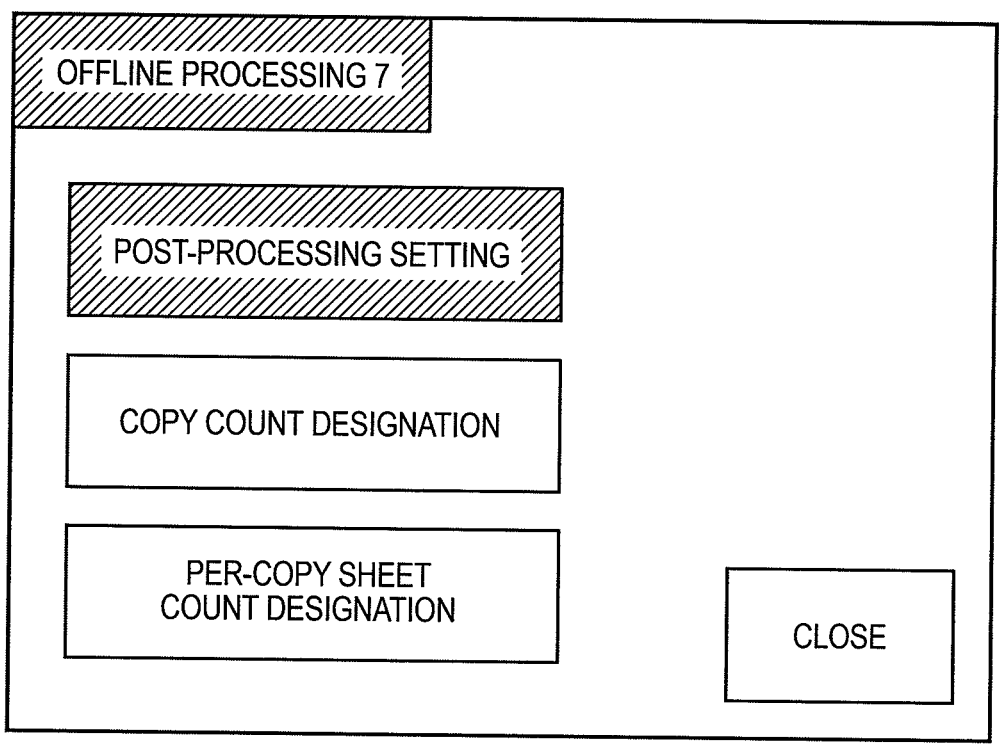
FIG. 29 is a schematic view showing a UI.

The full use mode will be explained with reference to the flowchart of FIG. 16. Note that the control unit 205 executes steps in the flowchart of FIG. 16. In step S2600, the process of the "full use mode" starts. In step S2601, the control unit 205 displays the "offline processing mode 7" UI screen (FIG. 29).

In step S2602, "post-processing setting" used in the full use mode is done. The "offline processing mode 7" UI screen (FIG. 29) displays a "post-processing setting" button. When the user presses the "post-processing setting" button on the "offline processing mode 7" UI screen (FIG. 29), the display screen switches to a "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". Then, when the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline sheets to a saddle stitching apparatus 200-3*c* from the "inserter" mounted at the top of the saddle stitching apparatus 200-3*c*.

In step S2606, the control unit 205 controls the saddle stitching apparatus 200-3*c* to create a saddle-stitched material using all sheets set on the inserter. In step S2607, the control unit 205 updates the job management information stored in the RAM 208 using the information set in step S2604. In step S2608, the "full use mode" in this process ends.

The "sheet count designation mode" will be described with reference to the flowchart of FIG. 17. Note that the control unit 205 executes steps in the flowchart of FIG. 17. In step S2700, the process of the "sheet count designation mode" starts. In step S2701, the control unit 205 displays the "offline processing mode 7" UI screen (FIG. 29).

In step S2702, the "offline processing mode 7" UI screen (FIG. 29) displays "post-processing setting", "copy count designation", and "per-copy sheet count designation" buttons. When the user presses the "post-processing setting" button on the "offline processing mode 7" UI screen (FIG. 29), the display screen switches to the "post-processing setting" UI screen (FIG. 10A). The "post-processing setting" UI screen (FIG. 10A) displays a plurality of types of post-processes. At this time, "saddle stitching processing" has already been set in step S4702 of the flowchart of FIG. 28.

In step S2703, the control unit 205 obtains the creation copy count of a printed material (saddle-stitched material) in offline processing. The user selects "copy count designation" from the "sheet count designation mode" UI screen (FIG. 19A) and presses the "copy count designation" button. In response to this, a "copy count designation (sheet count designation mode)" UI screen (FIG. 19B) appears. The user sets the copy count on the "copy count designation (sheet count designation mode)" UI screen (FIG. 19B). In the embodiment, the user sets 10 copies.

In step S2704, the sheet count of the body of the printed material (saddle-stitched material) in offline processing is set. The user selects "per-copy sheet count designation" from the "sheet count designation mode" UI screen (FIG. 19A) and presses the "per-copy sheet count designation" button. Then, a "sheet count designation (sheet count designation mode)" UI screen (FIG. 19C) appears. The user sets the sheet count of the printed material on the "sheet count designation (sheet count designation mode)" UI screen (FIG. 19C). In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "saddle stitching processing (body setting)" UI screen (FIG. 14A) is "inserter". Thus, the control unit 205 feeds offline sheets to the saddle stitching apparatus 200-3c from the "inserter" mounted at the top of the saddle stitching apparatus 200-3c.

In step S2708, the control unit 205 controls the saddle stitching apparatus 200-3c to create a saddle-stitched material using all sheets set on the inserter. In step S2709, the control unit 205 checks whether copies of the printed material have been created by the designated copy count. The control unit 205 stores the output copy count in the RAM 208. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

(Eighth Embodiment)

Figure 30:
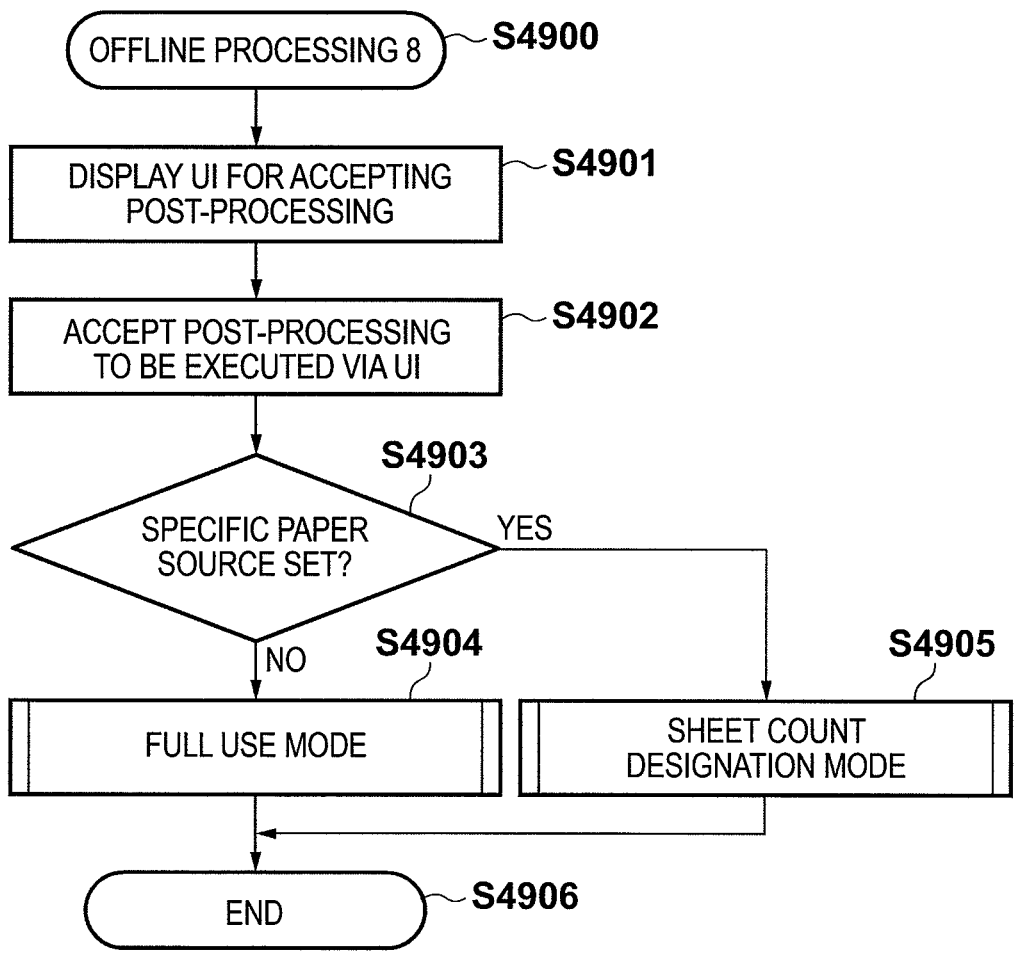
FIG. 30 is a flowchart showing the overall processing sequence of post-processing according to the eighth embodiment.

The eighth embodiment will be described with reference to the flowchart of FIG. 30. Note that a control unit 205 executes steps in the flowchart of FIG. 30. The eighth embodiment is another embodiment of the flowchart of FIG. 6 described in the first embodiment, and will be called "offline processing 8".

In step S4900, the process starts. In step S4901, the control unit 205 displays a UI screen (FIG. 31A) for offline processing 8 (manual mode UI). The UI screen (FIG. 31A) for offline processing 8 displays "post-processing setting", "copy count designation", "per-copy sheet count designation", and "paper setting" buttons. When the user presses the "paper setting" button on the offline UI screen (FIG. 31A), the display screen switches to a "paper setting (paper feed)" UI screen (FIG. 31B).

Figure 31A:
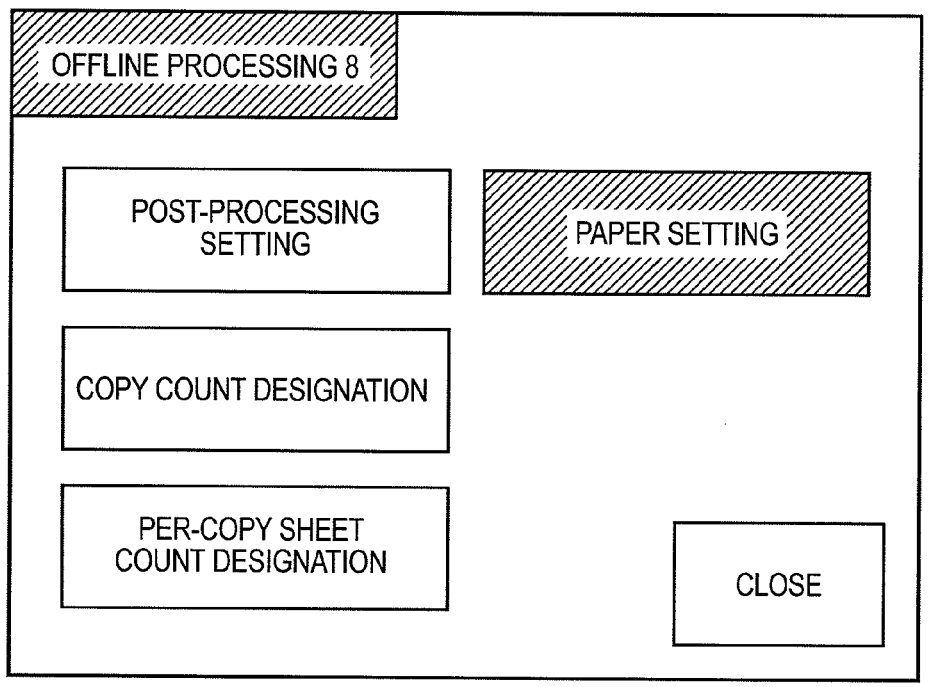
FIGS. 31A and 31B are schematic views each showing a UI.
Figure 31B:
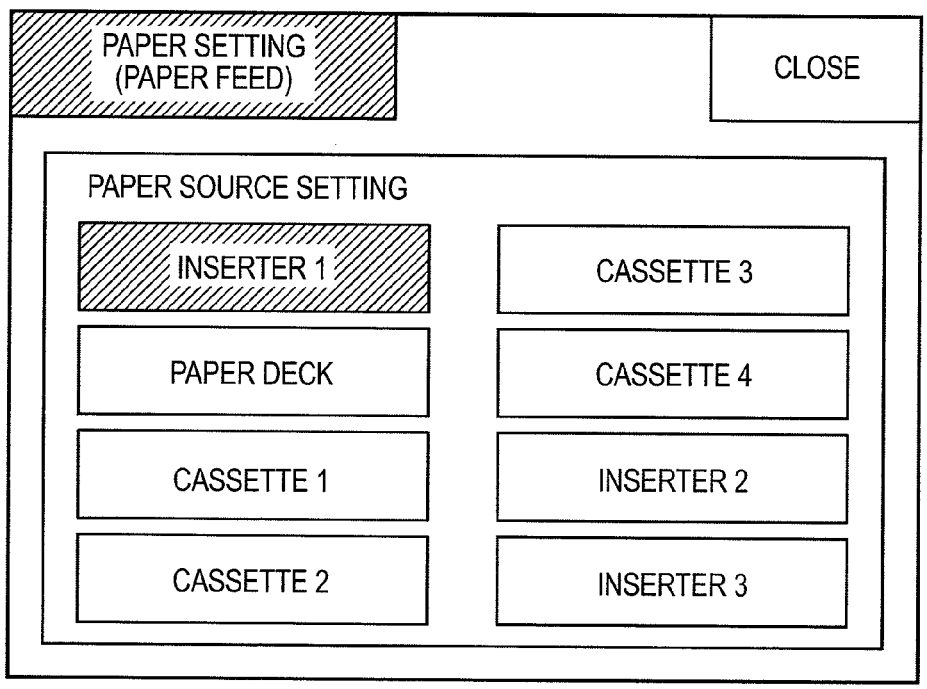

In step S4902, a paper information setting used in "offline processing 8" is accepted via the "paper setting (paper feed)" UI screen (FIG. 31B). On the "paper setting (paper feed)" UI screen (FIG. 31B), the user sets a paper source for feeding offline printing paper. In the embodiment, "inserter 1", "paper deck", "cassette 1", "cassette 2", "cassette 3", "cassette 4", "inserter 2", or "inserter 3" can be set. In the embodiment, the user selects "inserter 1".

When the user presses the "inserter 1" button on the "paper setting (paper feed)" UI screen (FIG. 31B), the display screen switches to a "paper setting (type/size)" UI screen (FIG. 25C). On the "paper setting (type/size)" UI screen (FIG. 25C), the user sets the type and size of paper to be fed in offline printing. The paper type includes "plain paper" and "thick paper". The paper size includes "A4" and "A3". In the embodiment, the user sets the paper type "plain paper" and the paper size "A3".

In step S4903, the control unit 205 determines, based on the paper source setting accepted via the "paper setting" UI screen (FIG. 31B) in step S4902, whether the set paper source is a specific paper source capable of post-processing. That is, the control unit 205 determines whether the set paper source is a specific supply source (second supply source) capable of providing a printed medium to a post-processing apparatus which executes the second post-processing. This is because inserter products vary such that some inserters are usable only for specific post-processing or include only one paper source or a plurality of paper sources. From this, the processing method of post-processing can be determined depending on an inserter designated in advance. If paper source information (supply source designation information) not determined in advance has been set on the "paper setting" UI screen (FIG. 31B), the process advances to the "full use mode" in step S4904. That is, if the set paper source is a supply source (first supply source) capable of providing a printed medium to a post-processing apparatus which executes the first post-processing, the process advances to step S4904. Details of the "full use mode" in step S4904 will be described later with reference to the flowchart of FIG. 16. If predetermined paper source information has been set on the "paper setting" UI screen (FIG. 31B), the process advances to the "sheet count designation mode" in step S4905. Details of the "sheet count designation mode" in step S4905 will be described with reference to the flowchart of FIG. 17. In step S4906, offline processing 8 in this process ends.

The full use mode will be explained with reference to the flowchart of FIG. 16. Note that the control unit 205 executes steps in the flowchart of FIG. 16. In step S2600, the process of the "full use mode" (first mode) starts. In step S2601, the control unit 205 displays the "offline processing mode 8" UI screen (FIG. 31A).

In step S2602, the "offline processing mode 8" UI screen (FIG. 31A) displays a "post-processing setting" button. When the user presses the "post-processing setting" button on the "offline processing mode 8" UI screen (FIG. 31A), the display screen switches to a "post-processing setting" UI screen (FIG. 10A). The "post-processing setting" UI screen (FIG. 10A) displays a plurality of types of post-processes. In the embodiment, saddle stitching processing is to be performed and the user selects saddle stitching processing.

When the user selects "saddle stitching processing" from a plurality of types of post-processes displayed on the "post-processing setting" UI screen (FIG. 10A) and presses the "saddle stitching processing" button, the display screen switches to a "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to a "saddle stitching processing (body setting)" UI screen (FIG. 14A). On the "saddle stitching processing (body setting)" UI screen (FIG. 14A), the user sets a paper source for feeding offline printing paper. In the embodiment, "inserter", "paper deck", "cassette 1", "cassette 2", "cassette 3", or "cassette 4" can be set. In the embodiment, the user selects "inserter".

When the user presses the "inserter" button on the "saddle stitching processing (body setting)" UI screen (FIG. 14A), the display screen switches to a "paper setting (body setting)" UI screen (FIG. 11B). On the "paper setting (body setting)" UI screen (FIG. 11B), the user sets the type and size of paper to be fed in offline printing. The paper type includes "plain paper" and "thick paper". The paper size includes "A4" and "A3". In the embodiment, the user sets the paper type "plain paper" and the paper size "A3". Then, when the user selects "cover setting" from the "saddle stitching processing" UI screen (FIG. 13B) and presses the "cover setting" button, the display screen switches to a "saddle stitching processing (cover setting)" UI screen (FIG. 14B). On the "saddle stitching processing (cover setting)" UI screen (FIG. 14B), the user sets a paper source for feeding offline printing paper to be used as a cover. In the embodiment, "inserter", "paper deck", "cassette 1", "cassette 2", "cassette 3", or "cassette 4" can be set. However, in the embodiment, no "cover" is used ("cover setting" in FIG. 13B becomes blank).

In step S2603, the control unit 205 manages the job information as offline post-processing job information. The control unit 205 stores this information as management information in a RAM 208. In step S2604, the control unit 205 determines whether it has accepted a job execution instruction. Note that the job execution instruction can be input by pressing a start key 5003. If the control unit 205 has accepted the job execution instruction, the process advances to step S2605; if NO, step S2604 is repeated again.

In step S2605, the control unit 205 feeds sheets to be used in offline processing from the paper source set in step S2602. In the embodiment, the paper source set on the "saddle stitching processing (body setting)" UI screen (FIG. 14A) is "inserter". The control unit 205 feeds offline sheets to a saddle stitching apparatus 200-3c from the "inserter" mounted at the top of the saddle stitching apparatus 200-3c.

In step S2606, the control unit 205 controls the saddle stitching apparatus 200-3c to create a saddle-stitched material using all sheets set on the inserter. In step S2607, the control unit 205 updates the job management information stored in the RAM 208 using the information set in step S2604. In step S2608, the full use mode in this process ends.

The sheet count designation mode will be described with reference to the flowchart of FIG. 17. Note that the control unit 205 executes steps in the flowchart of FIG. 17. In step S2700, the process of the "sheet count designation mode" starts. In step S2701, the control unit 205 displays the "offline processing mode 8" UI screen (FIG. 31A).

In step S2702, the "offline processing mode 8" UI screen (FIG. 31A) displays "post-processing setting", "copy count designation", "per-copy sheet count designation", and "paper setting" buttons. When the user presses the "post-processing setting" button on the "offline processing mode 8" UI screen (FIG. 31A), the display screen switches to the "post-processing setting" UI screen (FIG. 10A). The "post-processing setting" UI screen (FIG. 10A) displays a plurality of types of post-processes. When the user selects "saddle stitching processing" from a plurality of types of post-processes displayed on the "post-processing setting" UI screen (FIG. 10A) and presses the "saddle stitching processing" button, the display screen switches to the "saddle stitching processing" UI screen (FIG. 13B). The "saddle stitching processing" UI screen (FIG. 13B) displays buttons for selecting "body setting" and "cover setting". When the user selects "body setting" from the "saddle stitching processing" UI screen (FIG. 13B) and presses the "body setting" button, the display screen switches to the "saddle stitching processing (body setting)" UI screen (FIG. 14A). On the "saddle stitching processing (body setting)" UI screen (FIG. 14A), the user sets a paper source for feeding offline printing paper. In the embodiment, paper information has already been set because paper information has already been set in step S4902 of the flowchart of FIG. 30.

In step S2703, the creation copy count of a printed material (saddle-stitched material) in offline processing is set. The user selects "copy count designation" from the "offline processing mode 8" UI screen (FIG. 31A) and presses the "copy count designation" button. In response to this, a "copy count designation (sheet count designation mode)" UI screen (FIG. 19B) appears. The user sets the copy count on the "copy count designation (sheet count designation mode)" UI screen (FIG. 19B). In the embodiment, the user sets 10 copies.

In step S2704, the sheet count of the body of the printed material (saddle-stitched material) in offline processing is set. The user selects "per-copy sheet count designation" from the "sheet count designation mode" UI screen (FIG. 19A) and presses the "per-copy sheet count designation" button. Then, a "sheet count designation (sheet count designation mode)" UI screen (FIG. 19C) appears. The user sets the copy count on the "sheet count designation (sheet count designation mode)" UI screen (FIG. 19C). In the embodiment, the user sets 20 sheets.

In step S2705, the control unit 205 manages the job information as offline post-processing job information. The control unit 205 stores this information as management information in the RAM 208. In step S2706, the control unit 205 determines whether it has accepted a job execution instruction. Note that the job execution instruction can be input by pressing the start key 5003. If the control unit 205 has accepted the job execution instruction, the process advances to step S2707; if NO, step S2706 is repeated again.

In step S2707, the control unit 205 feeds sheets to be used in offline processing from the paper source set in step S2702. In the embodiment, the paper source set on the "paper setting (paper source)" UI screen (FIG. 31B) is "inserter 1". Thus, the control unit 205 feeds offline sheets to the saddle stitching apparatus 200-3c from the "inserter" mounted at the top of the saddle stitching apparatus 200-3c.

In step S2708, the control unit 205 controls the saddle stitching apparatus 200-3c to create a saddle-stitched material using all sheets set on the inserter. In step S2709, the control unit 205 checks whether copies of the printed material have been created by the designated copy count. The output copy count is stored in the RAM 208 under the control of the control unit 205 in FIG. 2. If copies of the printed material have been created by the designated copy count, the process advances to step S2710; if NO, steps S2707, S2708, and S2709 are repeated again.

In step S2710, the control unit 205 updates the job management information stored in the RAM 208 using the information set in step S2705. In step S2711, the "sheet count designation mode" in this process ends.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279856, filed Dec. 15, 2010, which is hereby incorporated by reference herein in its entirety.

What is claimed is:

1. A sheet processing system comprising:
   a receiving unit configured to receive a number of sheets; and
   a control unit configured to control a sheet processing apparatus to perform sheet processing in a first mode for feeding sheets of the number received by the receiving unit from a sheet holding unit and causing the sheet processing apparatus to execute the sheet processing for the fed sheets and to control the sheet processing apparatus to perform the sheet processing in a second mode for feeding sheets from the sheet processing apparatus until all sheets held in the sheet holding unit are fed and cause the sheet processing apparatus to execute the sheet processing for the fed sheets.

2. The sheet processing system according to claim 1, further comprising a selecting unit configured to select the first mode or the second mode,
   wherein the control unit controls the sheet processing apparatus to perform the sheet processing in the first mode in a case where the first mode is selected by the selecting unit, and
   wherein the control unit controls the sheet processing apparatus to perform the sheet processing in the second mode in a case where the second mode is selected by the selecting unit.

3. The sheet processing system according to claim 1, further comprising an accepting unit configured to accept a copy number for the sheet processing,
   wherein the control unit controls the sheet processing apparatus to perform the sheet processing in the first mode in a case where the copy number received by the receiving unit is more than a predetermined number, and
   wherein the control unit controls the sheet processing apparatus to perform the sheet processing in the second mode in a case where the copy number received by the receiving unit is not more than the predetermined number.

4. The sheet processing system according to claim 1, wherein the control unit controls the sheet processing apparatus to perform the sheet processing in the first mode in a case where the number of sheets is received by the receiving unit, and
   wherein the control unit controls the sheet processing apparatus to perform the sheet processing in the second mode in a case where the number of sheets is not received by the receiving unit.

5. The sheet processing system according to claim 1, further comprising a designating unit configured to designate a type of the sheets,
   wherein the control unit controls the sheet processing apparatus to perform the sheet processing in the first mode in a case where the type is designated by the designating unit, and
   wherein the control unit controls the sheet processing apparatus to perform the sheet processing in the second mode in a case where the type is not designated by the designating unit.

6. The sheet processing system according to claim 1, further comprising a designating unit configured to designate a type of the sheets,
   wherein the control unit controls the sheet processing apparatus to perform the sheet processing in the first mode in a case where the type designated by the designating unit is a predetermined type, and
   wherein the control unit controls the sheet processing apparatus to perform the sheet processing in the second mode in a case where the type designated by the designating unit is not the predetermined type.

7. The sheet processing system according to claim 1, further comprising a determining unit configured to determine a type of the sheet processing,
   wherein the control unit controls the sheet processing apparatus to perform the sheet processing in the first mode in a case where the type determined by the determining unit is a predetermined type, and
   wherein the control unit controls the sheet processing apparatus to perform the sheet processing in the second mode in a case where the type determined by the determining unit is not the predetermined type.

8. The sheet processing system according to claim 1, further comprising a printing unit configured to print an image on a sheet,
   wherein the control unit further controls to convey the sheet on which the image is printed by the printing unit, and controls the sheet processing apparatus to perform the sheet processing on the fed sheet.

9. A control method for controlling a sheet processing system, comprising:
   receiving a number of sheets;
   controlling a sheet processing apparatus to perform sheet processing in a first mode for feeding sheets of the received number from a sheet holding unit and causing the sheet processing apparatus to execute the sheet processing for the fed sheets; and
   controlling the sheet processing apparatus to perform the sheet processing in a second mode for feeding sheets from the sheet processing unit until all sheets held in the sheet holding unit are fed and cause the sheet processing apparatus to execute the sheet processing for the fed sheets.

10. A non-transitory computer readable storage medium for storing a computer program that, when executed by a computer, controls a sheet processing system to perform a method comprising:
   receiving a number of sheets;
   controlling a sheet processing apparatus to perform sheet processing in a first mode for feeding sheets of the received number from a sheet holding unit and causing the sheet processing apparatus to execute the sheet processing for the fed sheets; and
   controlling the sheet processing apparatus to perform the sheet processing in a second mode for feeding sheets from the sheet processing unit until all sheets held in the sheet holding unit are fed and cause the sheet processing apparatus to execute the sheet processing for the fed sheets.

* * * * *